(12) United States Patent
Ono et al.

(10) Patent No.: US 12,154,258 B2
(45) Date of Patent: *Nov. 26, 2024

(54) SURFACE ABNORMALITY DETECTION DEVICE AND SYSTEM

(71) Applicant: NEC Corporation, Tokyo (JP)

(72) Inventors: Yoshimasa Ono, Tokyo (JP); Akira Tsuji, Tokyo (JP); Hidemi Noguchi, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 17/599,757

(22) PCT Filed: Mar. 17, 2020

(86) PCT No.: PCT/JP2020/011759
§ 371 (c)(1),
(2) Date: Sep. 29, 2021

(87) PCT Pub. No.: WO2020/203263
PCT Pub. Date: Oct. 8, 2020

(65) Prior Publication Data
US 2022/0156914 A1    May 19, 2022

(30) Foreign Application Priority Data

Apr. 3, 2019 (WO) ................. PCT/JP2019/014790

(51) Int. Cl.
*G06T 7/00* (2017.01)
*G01B 11/30* (2006.01)
(Continued)

(52) U.S. Cl.
CPC ........... *G06T 7/0004* (2013.01); *G01B 11/30* (2013.01); *G01C 3/06* (2013.01); *G01N 21/956* (2013.01);
(Continued)

(58) Field of Classification Search
CPC .................. G06T 7/0004; G06T 7/70; G06T 2207/10028; G06T 7/0002; G06T 1/00;
(Continued)

(56) References Cited

U.S. PATENT DOCUMENTS 4,681,442 A    7/1987 Wagner
5,774,212 A *  6/1998 Corby, Jr. ........ G01N 21/95684
                                                  356/237.2
(Continued)

FOREIGN PATENT DOCUMENTS

CN    109242828 A *  1/2019 ............. G06T 5/002
JP    11183623 A *   7/1999
(Continued)

OTHER PUBLICATIONS

Bian et al, Liadar based edge-detection for bridge degect identification, Proceedings vol. 8347, Nondestructive Characterization for Composite Materials, Aerospace Engineering, Civil Infrastructure, and Homeland Security; 83470X (Year: 2012).*

(Continued)

*Primary Examiner* — Ping Y Hsieh
*Assistant Examiner* — Xiao Liu

(57) ABSTRACT

There is provided a surface abnormality detection device, and a system, capable of detecting an abnormal portion having a displacement below the distance measurement accuracy when detecting the abnormal portion on the surface of a structure. A surface abnormality detection device includes a classification means for classifying an object under measurement into one or more clusters having the same structure, based on position information at a plurality of points on a surface of the object under measurement; a determination means for determining a reflection brightness normal value of the cluster based on a distribution of reflection brightness values at a plurality of points on a (Continued)

surface of the cluster; and an identification means for identifying an abnormal portion on the surface of the cluster based on a difference between the reflection brightness normal value and the reflection brightness value at each of the plurality of points.

4 Claims, 25 Drawing Sheets

(51) Int. Cl.
*G01C 3/06* (2006.01)
*G01N 21/956* (2006.01)
*G01S 17/06* (2006.01)
*G01S 17/89* (2020.01)
*G06T 7/70* (2017.01)
*G06V 10/764* (2022.01)

(52) U.S. Cl.
CPC ............... *G01S 17/06* (2013.01); *G01S 17/89* (2013.01); *G06T 7/70* (2017.01); *G06V 10/764* (2022.01); *G06T 2207/10028* (2013.01)

(58) Field of Classification Search
CPC ....... G01B 11/30; G01B 11/24; G01B 11/303; G01C 3/06; G01N 21/956; G01N 2021/8861; G01N 2021/8887; G01N 21/8851; G01N 21/9515; G01S 17/06; G01S 17/89; G01S 7/4802; G06V 10/764
See application file for complete search history.

(56) References Cited

U.S. PATENT DOCUMENTS

| | | |
|---|---|---|
| 2002/0070363 A1 | 6/2002 | Muraki et al. |
| 2005/0110986 A1 | 5/2005 | Nikoonahad et al. |
| 2016/0124076 A1 | 5/2016 | Nakatani et al. |
| 2022/0276181 A1 | 9/2022 | Ono et al. |

FOREIGN PATENT DOCUMENTS

| | | | |
|---|---|---|---|
| JP | H11-183623 A | | 7/1999 |
| JP | 2002-181520 A | | 6/2002 |
| JP | 2009-204425 A | | 9/2009 |
| JP | 2012-078144 A | | 4/2012 |
| JP | 2012-159376 A | | 8/2012 |
| JP | 2012-207948 A | | 10/2012 |
| JP | 2013-195368 A | | 9/2013 |
| JP | 2016-118502 A | | 6/2016 |
| JP | 2016105081 A | * | 6/2016 |
| JP | 2017-032360 A | | 2/2017 |
| JP | 2017-083348 A | | 5/2017 |
| JP | 2017-173054 A | | 9/2017 |
| JP | 6263519 B2 | | 1/2018 |
| JP | 2018-137413 A | | 8/2018 |
| JP | 2019-020580 A | | 2/2019 |

OTHER PUBLICATIONS

International Search Report for PCT Application No. PCT/JP2020/011759, mailed on Apr. 21, 2020.

R. Turner, et. al, "Estimation of soil surface roughness of agricultural soils using airborne LIDAR", Remote Sensing of Envrionment 140, 2014, pp. 107-117.

S. Kaasalainen, et. al, "Radiometric Calibration of LIDAR Intensity With Commercially Available Reference Targets", IEEE Transactions on Geoscience and Remote Sensing, vol. 47, No. 2, Feb. 2009, pp. 588-598.

X. Li and Y. Liang, "Remote measurement of surface roughness, surface reflectance, and body reflectance with LIDAR", Applied Optics vol. 54, No. 30, pp. 8904-8912, Oct. 20, 2015.

International Search Report for PCT Application No. PCT/JP2019/033294, mailed on Nov. 19, 2019. 12 pages.

United States Office Action for U.S. Appl. No. 17/635,523, mailed on Apr. 16, 2024. 18 pages.

* cited by examiner

CLOUD DATA FOR EVALUATION

CLOUD DATA FOR COMPARISON

RANGE IMAGE MEASURED FROM S71

RANGE IMAGE MEASURED FROM S72

REGION TO BE EXCLUDED

SURFACE ABNORMALITY DETECTION DEVICE AND SYSTEM

This application is a National Stage Entry of PCT/JP2020/011759 filed on Mar. 17, 2020, which claims priority from PCT International Patent Application PCT/JP2019/014790 filed on Apr. 3, 2019, the contents of all of which are incorporated herein by reference, in their entirety.

TECHNICAL FIELD

The present disclosure relates to a surface abnormality detection device and a system, and more particularly, to a surface abnormality detection device, and a system, capable of detecting an abnormal portion having a displacement below the distance measurement accuracy when detecting the abnormal portion on the surface of a structure.

BACKGROUND ART

In complex equipment in a facility, a portion of deterioration such as rust or peeling of coating which appears on the surface of a structure increases the possibility of causing, in the near future, a failure. The identification of such an abnormal portion on the surface often currently relies on visual determination, and therefore, the importance of a system for automatically identifying the abnormal portion is growing from the viewpoint of oversight, determination based on subjectivity, and additional processes of dispatching inspectors. A laser distance measurement device is a device capable of acquiring a three-dimensional structure of an object in the surroundings of the device, and often has a function of measuring received light brightness of laser light in addition to the information of a three-dimensional object point. In general, the received light brightness, i.e., reflection brightness from the object depends on the state of the object surface to which the laser light is emitted. This enables a portion of an abnormality such as rust or peeling of coating on the surface to be detected through the processing of the received light brightness information acquired by the laser distance measurement device. Hereinafter, in the present disclosure, the received light brightness acquired by the laser distance measurement device is referred to as "reflection brightness."

Patent Literature 1 discloses that a minimum curvature direction estimation unit estimates a minimum curvature direction for each region, an autocorrelation value calculation unit calculates an autocorrelation value of a feature amount of a partial region for each region, a sweep shape candidate region determination unit determines that each region in which the autocorrelation value is larger than a threshold is a sweep shape candidate region, a region integration processing unit integrates the regions determined to be the sweep shape candidate regions, and a sweep shape determination unit determines whether the integrated region has a sweep shape.

In Non Patent Literature 1, the roughness of a surface to be observed is measured based on position information of a point cloud. To obtain the surface roughness, an average curved surface is locally calculated, so that the displacement of the point cloud from the plane can be calculated as roughness. In Non Patent Literature 1, a roughness value of the ground surface observed from the distance measurement device of an aircraft is measured with centimeter (cm) scale accuracy.

In Non Patent Literature 2 and Non Patent Literature 3, the recognition of an object under measurement and the determination of materials are attempted by focusing on the information of reflection brightness of the point cloud. There is adopted a method of correcting the reflection brightness acquired by the laser distance measurement device by assuming modeling based on the radar equation and modeling of the bidirectional reflectance distribution function for the reflection brightness of the acquired point cloud.

CITATION LIST

Patent Literature

Patent Literature 1
Japanese Unexamined Patent Application Publication No. 2016-118502
Non Patent Literature 1
R. Turner, et. al, "Estimation of soil surface roughness of agricultural soils using airborne LiDAR", Remote Sens. Envrion. 2014, 140, 107-117, (2014)
Non Patent Literature 2
S. Kaasalainen, et. al, "Radiometric Calibration of LIDAR Intensity With Commercially Available Reference Targets", IEEE Transactions on Geoscience and Remote Sensing, vol. 47, pp. 588-598, (2009)
Non Patent Literature 3
X. Li and Y. Liang, "Remote measurement of surface roughness, surface reflectance, and body reflectance with LiDAR", Appl. Opt. 54(30), 8904-8912, (2015)

SUMMARY OF INVENTION

Technical Problem

Patent Literature 1 does not disclose that the abnormal portion on the surface of the structure is detected. In the method in Non Patent Literature 1, it is impossible to detect the roughness below the distance measurement accuracy of the laser distance measurement device. The deterioration such as rust or peeling of coating on the surface is a displacement that is below approximately 1 millimeter (mm), and is finer than the accuracy of the laser distance measurement device which is widely used at present. Therefore, it is difficult to identify these abnormal portions on the surface from the roughness based on the position information of the point cloud. In the above-described methods in Non Patent Literature 2 and Non Patent Literature 3, it is difficult to identify the abnormality on the surface of the equipment in the facility in which the equipment having a complex structure is disorderly arranged. In such a facility, since the absorption property and reflection anisotropy of the laser light are different from surface to surface of the equipment, it is difficult to determine the abnormal portion based on the information of only the reflection brightness. For example, when the abnormal portion is determined based on a uniform threshold for the reflection brightness, all of the used surface materials having a strong absorption of the laser light wavelength are determined as the abnormal portions. In addition, the modeling of the reflection and absorption properties with respect to the all the surfaces of the equipment in the facility is not a realistic method.

To solve any one of the above-described problems, an object of the present disclosure is to provide a surface abnormality detection device, a system, and a method.

Solution to Problem

A surface abnormality detection device according to the present disclosure includes:

a classification means for classifying an object under measurement into one or more clusters having the same structure, based on position information at a plurality of points on a surface of the object under measurement;

a determination means for determining a reflection brightness normal value of the cluster based on a distribution of reflection brightness values at a plurality of points on a surface of the cluster; and an identification means for identifying an abnormal portion on the surface of the cluster based on a difference between the reflection brightness normal value and the reflection brightness value at each of the plurality of points on the surface of the cluster.

A surface abnormality detection device according to the present disclosure includes:

a first calculation means for calculating a first incident angle of a laser for each of a plurality of distance measurement points based on position information of a first observation point, and position information, included in first point cloud data, of the plurality of distance measurement points of a surface of an object under measurement;

a second calculation means for calculating a second incident angle of a laser for each of the plurality of distance measurement points based on position information of a second observation point, and position information of the plurality of distance measurement points included in second point cloud data;

a position control means for making an adjustment to match positions for each of the plurality of distance measurement points based on the position information of the plurality of distance measurement points in the first point cloud data and the position information of the plurality of distance measurement points in the second point cloud data;

a brightness difference calculation means for calculating, for each of the plurality of distance measurement points, a reflection brightness difference value which is a difference between a first reflection brightness value at each of the plurality of distance measurement points in the first point cloud data after the position adjustment and a second reflection brightness value at each of the plurality of distance measurement points in the second point cloud data after the position adjustment;

a correction means for calculating, for each of the plurality of distance measurement points, an incident angle difference which is a difference between the first incident angle at each of the plurality of distance measurement points in the first point cloud data after the position adjustment and the second incident angle at each of the plurality of distance measurement points in the second point cloud data after the position adjustment, and correcting, for each of the plurality of distance measurement points, the reflection brightness difference value based on the incident angle difference; and an identification means for identifying an abnormal portion of the object under measurement based on the reflection brightness difference value after the correction.

A surface abnormality detection device according to the present disclosure includes:

a position control means for making an adjustment to match positions for each of a plurality of distance measurement points based on position information of the plurality of distance measurement points on a surface of an object under measurement, the position information being included in cloud data for evaluation and position information of the plurality of distance measurement points included in cloud data for comparison;

a brightness difference calculation means for calculating, for each of the plurality of distance measurement points, a reflection brightness difference value which is a difference between a reflection brightness value for evaluation at each of the plurality of distance measurement points in the cloud data for evaluation after the position adjustment and a reflection brightness value for comparison at each of the plurality of distance measurement points in the cloud data for comparison after the position adjustment; and an identification means for identifying an abnormal portion of the object under measurement based on the reflection brightness difference value.

A surface abnormality detection device according to the present disclosure includes:

a classification means for evaluation for classifying an object under measurement into one or more clusters having the same structure, based on position information at a plurality of distance measurement points on a surface of the object under measurement included in cloud data for evaluation;

a classification means for comparison for classifying the object under measurement into one or more clusters having the same structure, based on position information at the plurality of distance measurement points included in cloud data for comparison;

a determination means for comparison for determining a reflection brightness normal value for each cluster of the cloud data for comparison based on a distribution of reflection brightness values at the plurality of distance measurement points of the cluster of the cloud data for comparison;

a control means for associating the cluster of the cloud data for evaluation with the cluster of the cloud data for comparison recognized as having the same structure, based on the position information of the plurality of distance measurement points of the cluster of the cloud data for evaluation and the position information of the plurality of distance measurement points of the cluster of the cloud data for comparison;

a calculation means for calculating a reflection brightness normal difference value which is a difference between the reflection brightness value at each of the plurality of distance measurement points of the cluster of the cloud data for evaluation and the reflection brightness normal value of the cluster of the cloud data for comparison corresponding to the cluster of the cloud data for evaluation; and an identification means for identifying, for each cluster, an abnormal portion on the surface of the object under measurement based on the reflection brightness normal difference value.

A system according to the present disclosure includes:
a measurement device; and a surface abnormality detection device,
wherein
the measurement device acquires
a reflection brightness value at each of a plurality of points on a surface of an object under measurement, and
the surface abnormality detection device includes:
a classification means for classifying the object under measurement into one or more clusters having the same structure, based on position information at a plurality of points on the surface of the object under measurement;
a determination means for determining a reflection brightness normal value of the cluster based on a distribution of reflection brightness values at a plurality of points on a surface of the cluster; and
an identification means for identifying an abnormal portion on the surface of the cluster based on a difference between the reflection brightness normal value and the reflection brightness value at each of the plurality of points on the surface of the cluster.

Advantageous Effects of Invention

According to the present disclosure, there can be provided a surface abnormality detection device, and a system, capable of detecting an abnormal portion having a displacement below the distance measurement accuracy when detecting the abnormal portion on the surface of a structure.

DESCRIPTION OF EMBODIMENTS

Hereinafter, example embodiments of the present invention will be described with reference to the drawings. Throughout the drawings, the same or corresponding components are denoted by the same reference symbols and overlapping description will be omitted as appropriate for the sake of clarity of the description.

First Example Embodiment

An overview of a surface abnormality detection device and a system according to a first example embodiment will be described.

Figure 1:
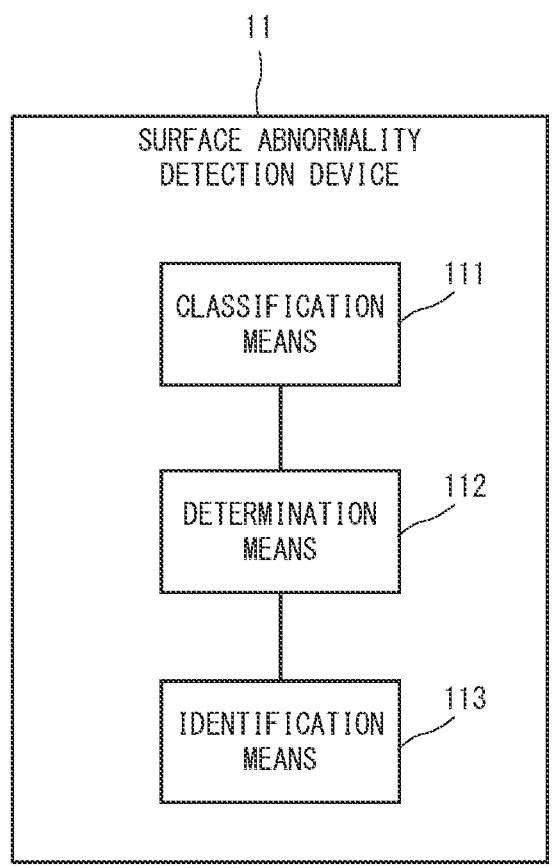
FIG. 1 is a block diagram illustrating a surface abnormality detection device according to a first example embodiment.

FIG. 1 is a block diagram illustrating the surface abnormality detection device according to the first example embodiment.

Figure 2:
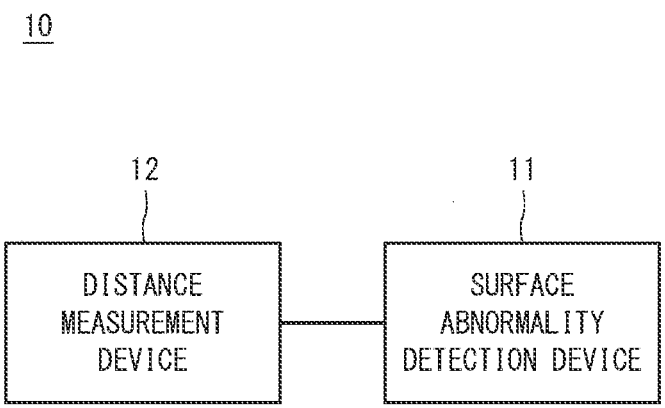
FIG. 2 is a block diagram illustrating a system according to the first example embodiment.

FIG. 2 is a block diagram illustrating the system according to the first example embodiment.

As illustrated in FIG. 1, a surface abnormality detection device 11 according to the first example embodiment includes a classification means 111, a determination means 112, and an identification means 113.

The classification means 111 classifies an object under measurement into a cluster having the same structure, based on position information at a plurality of points on a surface of the object under measurement. The position information can be represented as position information on three-dimensional coordinates, for example.

The determination means 112 determines a reflection brightness normal value of the cluster based on the distribution of reflection brightness values at the plurality of points on the surface of the cluster. In the case where there are a plurality of classified clusters, the determination means 112 determines a reflection brightness normal value for each of the plurality of clusters.

The identification means 113 identifies an abnormal portion on the surface of the cluster based on a difference between the reflection brightness normal value and the reflection brightness value at each of the plurality of points on the surface of the cluster. In the case where there are a plurality of classified clusters, the identification means 113 identifies an abnormal portion on the surface for each of the plurality of clusters.

The data including the position information at the plurality of points on the surface of the object under measurement and the reflection brightness value at each position is referred to as point cloud data of the object under measurement. The data including the position information at the plurality of points on the surface of the cluster and the reflection brightness value at each position is referred to as point cloud data of the cluster. However, the cluster will be described later.

As illustrated in FIG. 2, a system 10 according to the first example embodiment includes a distance measurement device 12 and the surface abnormality detection device 11. The distance measurement device may be also referred to as a measurement device.

The distance measurement device 12 includes a laser distance measurement device or the like, and acquires three-dimensional shape data of a surrounding object including the object under measurement. The surface abnormality detection device 11 acquires the three-dimensional shape data from the distance measurement device 12 and identifies a portion where the surface state is abnormal, from the acquired three-dimensional shape data.

In the following description of the example embodiment, the three-dimensional shape data acquired by the distance measurement device 12 (laser distance measurement device) is acquired as "three-dimensional point cloud data" including the position information on three-dimensional coordinates of the plurality of points on the surface of the object (object under measurement) and the information of the reflection brightness (reflection brightness value) at each position. In the description of the example embodiment, the processing on the "three-dimensional point cloud data" will be described, but the present invention is not limited thereto. The example embodiment is applicable to the point cloud data which includes the space information capable of identifying three-dimensional coordinates and the reflection brightness at the coordinates (position). The three-dimensional point cloud data may be also referred to as three-dimensional data or point cloud data. In addition, the plurality of points on the surface of the object under measurement may be also referred to as a point cloud.

Here, an overview of the classification of an object under measurement into the same structure and the determination of an abnormal portion will be described.

Figure 3:
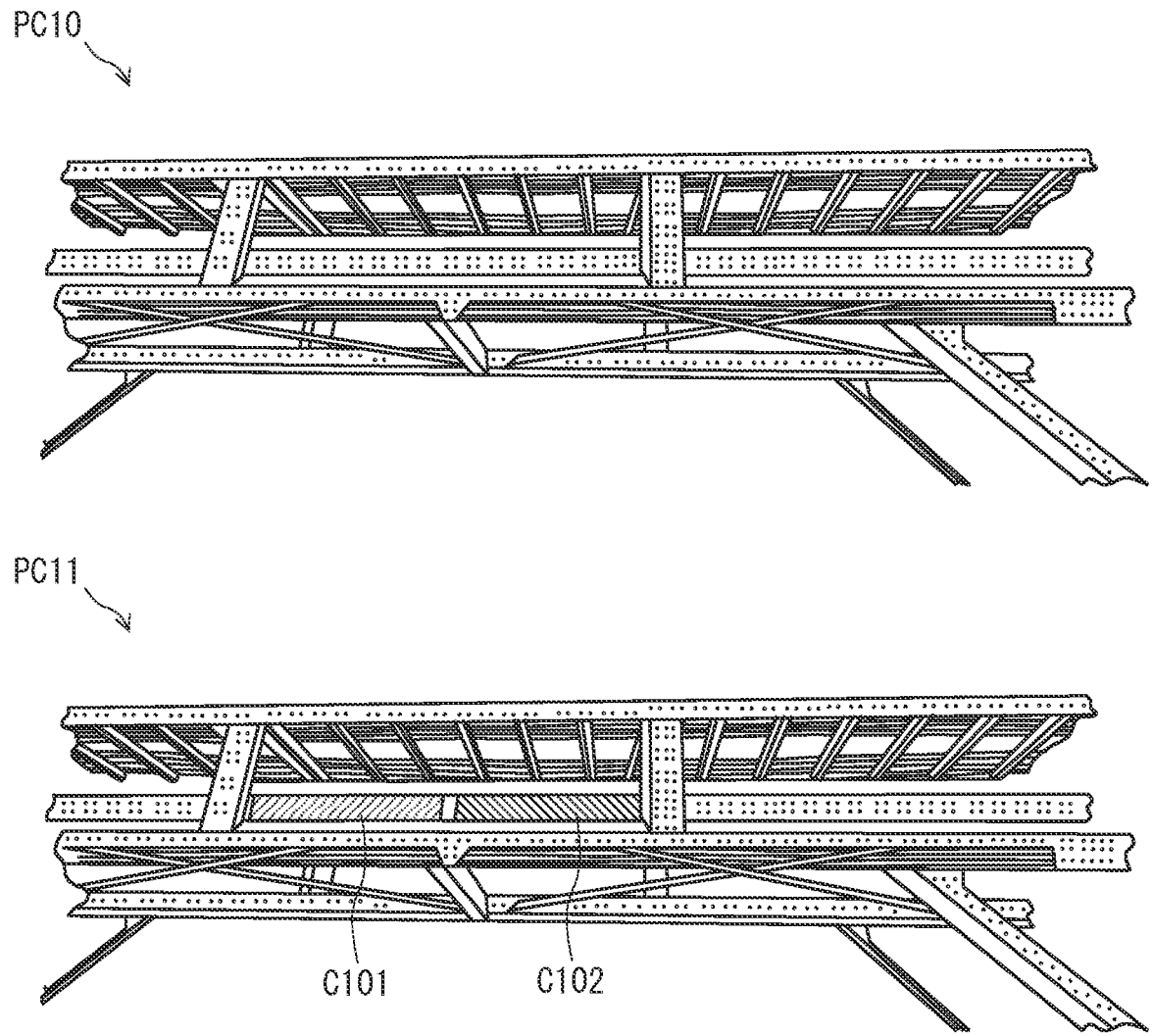
FIG. 3 is a diagram illustrating the classification of an object under measurement into the same structure, according to the first example embodiment.

FIG. 3 is a diagram illustrating the classification of the object under measurement into the same structure, according to the first example embodiment.

Figure 4:
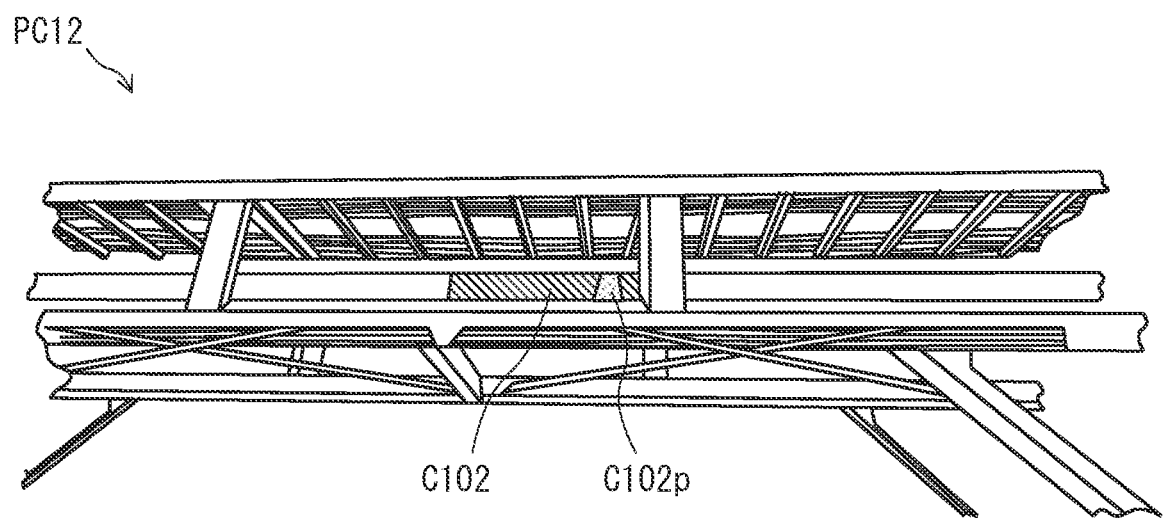
FIG. 4 is a diagram illustrating an abnormal portion in the classified structure, according to the first example embodiment.
Figure 4:
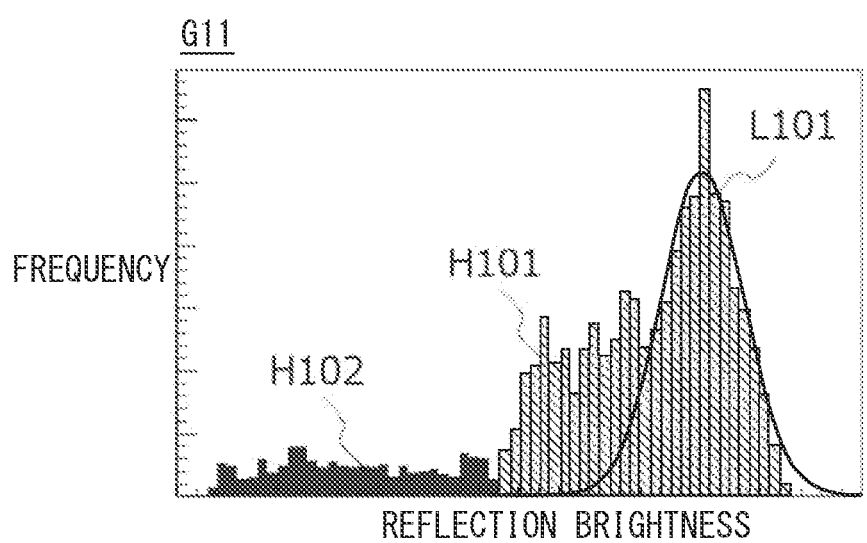

FIG. 4 is a diagram illustrating an abnormal portion in the classified structure, according to the first example embodiment.

A point cloud PC10 illustrated in FIG. 3 indicates a point cloud on the surface of the object under measurement. The distance measurement device 12 acquires the point cloud data including the position information on three-dimensional coordinates and the reflection brightness in the point cloud PC10. That is, the point cloud data acquired by the distance measurement device 12 is expressed as in the point cloud PC10 as a set of points including the position information on three-dimensional coordinates and the reflection brightness. Since a plurality of structures whose surface states are different in paint or the like exist in the point cloud PC10, it is difficult to determine the abnormal portion on the surface by a uniform reflection brightness value.

Therefore, the surface abnormality detection device 11 according to the first example embodiment divides and classifies the point cloud constituting the same structure into clusters by a clustering process based on the position information on three-dimensional coordinates. A point cloud PC11 illustrated in FIG. 3 indicates a part of clusters after the clustering process. A cluster C101 and a cluster C102 of the point cloud PC11 are point clouds which are determined and classified as different structures. However, examples of algorithms of the clustering include a method of determining the same cluster by using Euclidean distance as a threshold, and a region growth method of determining the same cluster based on the continuity of angles of perpendicular lines among neighboring points.

A point cloud PC12 illustrated in FIG. 4 indicates a partial cluster C102$p$, which is a cluster which includes many point clouds in which the reflection brightness value is below a predetermined threshold, in the cluster C102. The partial cluster C102$p$ includes many point clouds in which the reflection brightness is weaker than the others. Note that the point clouds other than the cluster C102 are not illustrated for simplification purposes.

A reflection brightness distribution G11 illustrated in FIG. 4 represents the reflection brightness values of the point cloud corresponding to the cluster C102 by a histogram. In the cluster C102, for example, a portion (abnormal portion) whose surface has become rough due to rust has the reflection brightness that is lower than that at the other portions.

As an example in which such an abnormal portion is determined, there is a method of calculating an approximate curve L101 with respect to the histogram of the portion in which the paint remains, and determining the point cloud having the reflection brightness deviating from the approximate curve L101 as the point cloud having the abnormal surface. This determination method enables separation of a histogram H101 having normal reflection brightness values from a histogram H102 having abnormal reflection brightness. The abnormal portion in the structure can be determined by recognizing the point cloud corresponding to the histogram H102 as the abnormal portion.

An operation of the surface abnormality detection device according to the first example embodiment will be described.

Figure 5:
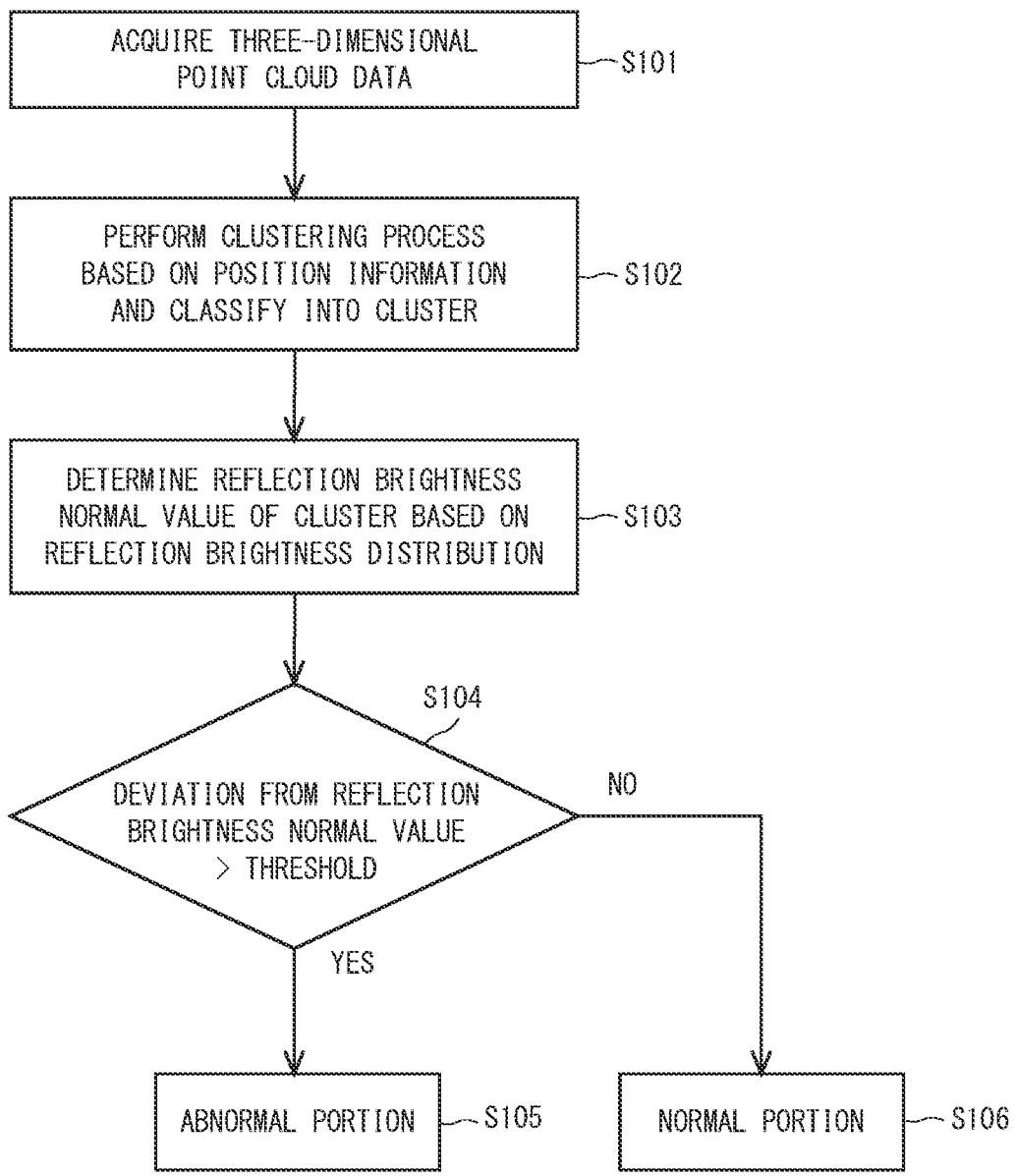
FIG. 5 is a flowchart illustrating an operation of the surface abnormality detection device according to the first example embodiment.

FIG. 5 is a flowchart illustrating the operation of the surface abnormality detection device according to the first example embodiment.

As illustrated in FIG. 5, the surface abnormality detection device 11 acquires the three-dimensional point cloud data (step S101).

The surface abnormality detection device 11 performs the clustering process based on the position information of the three-dimensional point cloud data, and classifies the three-dimensional point cloud data into the point cloud having the same structure, i.e., the cluster (step S102).

The surface abnormality detection device 11 determines a normal value of the reflection brightness of the point cloud (cluster) classified into the same structure, based on the reflection brightness distribution of the point cloud (step S103). In the case where there are a plurality of point clouds classified into the same structure, a normal value of the reflection brightness is determined for each of the plurality of point clouds. The normal value of the reflection brightness is referred to as a reflection brightness normal value.

When the deviation of the reflection brightness value of a point cloud from the reflection brightness normal value determined in step S103 exceeds the threshold (step S104: YES), the surface abnormality detection device 11 determines the point cloud as the abnormal portion on the surface (step S105). That is, when, a difference between the reflection brightness value of a point cloud among a plurality of points on the surface of a point cloud (cluster) and the reflection brightness normal value of the point cloud exceeds the threshold, the surface abnormality detection device 11 determines, as the abnormal portion, the point cloud (or the point) in this case.

When the deviation of the reflection brightness value of the point cloud from the reflection brightness normal value determined in step S103 is below the threshold (step S104: NO), the surface abnormality detection device 11 determines the point cloud as the normal portion on the surface (step S106). That is, when, a difference between the reflection brightness value of a point cloud among a plurality of points on the surface of a point cloud (cluster) and the reflection brightness normal value of the point cloud is below the threshold, the surface abnormality detection device 11 determines, as the normal portion, the point cloud (or the point) in this case.

Thus, the surface abnormality detection device 11 of the first example embodiment can identify the abnormal portion on the surface from the three-dimensional point cloud data including the reflection brightness. This makes it possible to identify the abnormal portion for the surface roughness finer than the distance measurement accuracy of the distance measurement device 12, and reduce false detection. Furthermore, a portion where the reflection brightness is abnormal is identified on a per structure basis, whereby the abnormal portion can be identified for the structures whose surface states are different.

As a result, there can be provided a surface abnormality detection device, and a system, capable of detecting an abnormal portion having a displacement below the distance measurement accuracy when detecting the abnormal portion on the surface of a structure.

Second Example Embodiment

A surface abnormality detection device 21 according to a second example embodiment is different from the surface abnormality detection device 11 according to the first example embodiment in that the reflection brightness attenuation caused according to the distance between a point cloud and an observation point is corrected for the reflection brightness of the point cloud.

When a part of the structure (object under measurement) extends in a depth direction as viewed from the observation point, a light propagation distance is different between near point cloud and far point cloud on the surface of the structure. As a result, since the attenuation is caused by light absorption and light scattering, the reflection brightness changes. Therefore, as compared with the surface abnormality detection device 11, the surface abnormality detection device 21 performs an additional process of correcting the reflection brightness according to the distance between the point cloud and the observation point. In this way, the surface abnormality detection device 21 can identify the abnormal portion with higher accuracy than in the surface abnormality detection device 11.

An operation of the surface abnormality detection device 21 according to the second example embodiment will be described.

Figure 6:
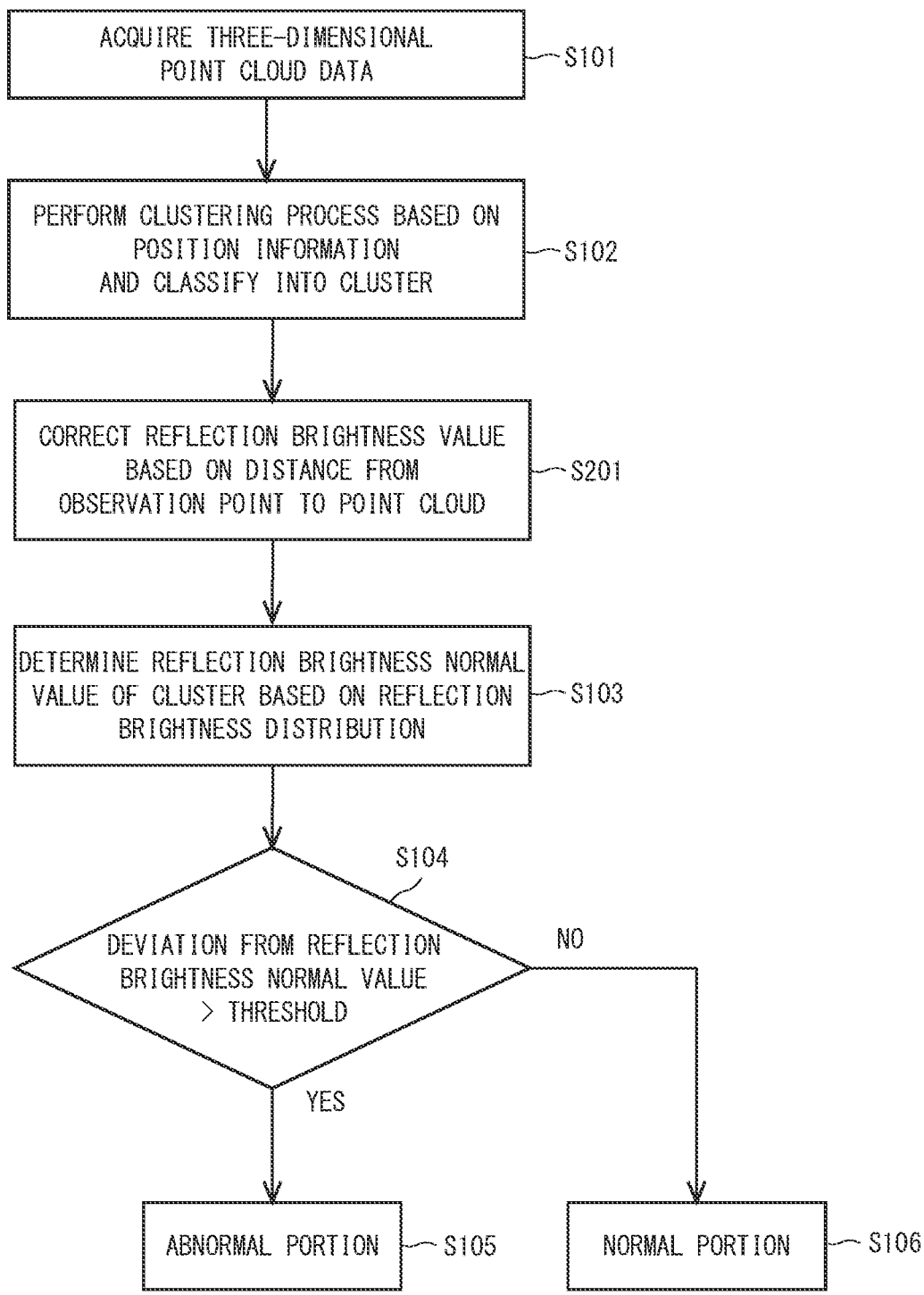
FIG. 6 is a flowchart illustrating an operation of a surface abnormality detection device according to a second example embodiment.

FIG. 6 is a flowchart illustrating the operation of the surface abnormality detection device according to the second example embodiment.

As illustrated in FIG. 6, the processes from step S101 to step S102 are performed in a similar manner to those in the first example embodiment. After step S102, the surface abnormality detection device 21 corrects the reflection brightness value of each point cloud based on the distance from the observation point to the point cloud (step S201). That is, the reflection brightness value is corrected based on an attenuation amount due to the distance between the surface abnormality detection device 21 which is the observation point and the point (point cloud) on the surface of the cluster. The reflection brightness value is a value obtained by correcting the attenuation amount based on the distance between the surface abnormality detection device 21 which is the observation point and the point (point cloud) on the surface of the cluster. For example, the reflection brightness may be corrected by performing the attenuation correction by the distance to the fourth power according to the radar equation. In addition, for example, the reflection brightness may be corrected by using an estimation value based on absorption by a propagation medium.

After step S201, the processes from step S103 to step S106 are performed in a similar manner to those in the first example embodiment.

However, the example has been described in which step S201 is performed between step S102 and step S103, but is not limited thereto. The sequence of processes may be arbitrary when the requirement that step S201 is performed before step S103 is satisfied.

In this way, the surface abnormality detection device 21 according to the second example embodiment can identify the abnormal portion on the surface of the structure, in particular, the structure extending in the depth direction, with higher accuracy than in the surface abnormality detection device 11 according to the first example embodiment.

Third Example Embodiment

Figure 7:
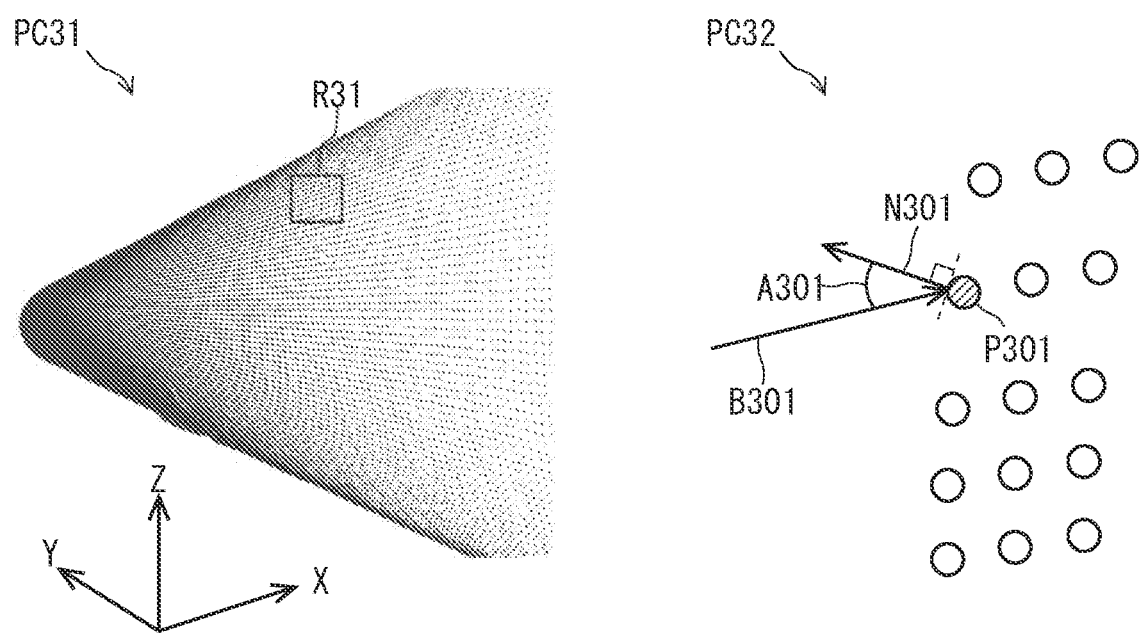
FIG. 7 is a diagram illustrating a laser incident angle according to a third example embodiment.

FIG. 7 is a diagram illustrating a laser incident angle according to a third example embodiment.

A surface abnormality detection device 31 according to a third example embodiment is different from the surface abnormality detection device 11 according to the first example embodiment in that a process of correcting reflection brightness relative to the laser incident angle at each point is added.

Regarding the reflected light of the laser from a surface of the structure, the angular dependence of the reflection brightness changes according to the nature of the surface. The angular dependence of the reflection brightness of the laser reflected light changes according to the nature of the surface of the structure. Therefore, when the surface of the structure is curved, the abnormal portion on the surface of the structure can be identified with higher accuracy by correcting the reflection brightness.

A point cloud PC32 illustrated in FIG. 7 is a schematic view in which a point cloud in a three-dimensional region R31 in a point cloud PC31 is enlarged. The description will be made by way of example where a point cloud on a cylindrical pipe is used as the point cloud PC31.

As illustrated in FIG. 7, a laser incident angle A301 at a distance measurement point P301 is calculated as an angle formed by a laser incident direction B301 that connects the distance measurement point P301 and an observation point (surface abnormality detection device 31) and a perpendicular line N301 at the distance measurement point P301. The perpendicular line N301 is calculated by using a distance measurement point cloud in the surroundings of the distance measurement point P301.

An operation of the surface abnormality detection device 31 according to the third example embodiment will be described.

Figure 8:
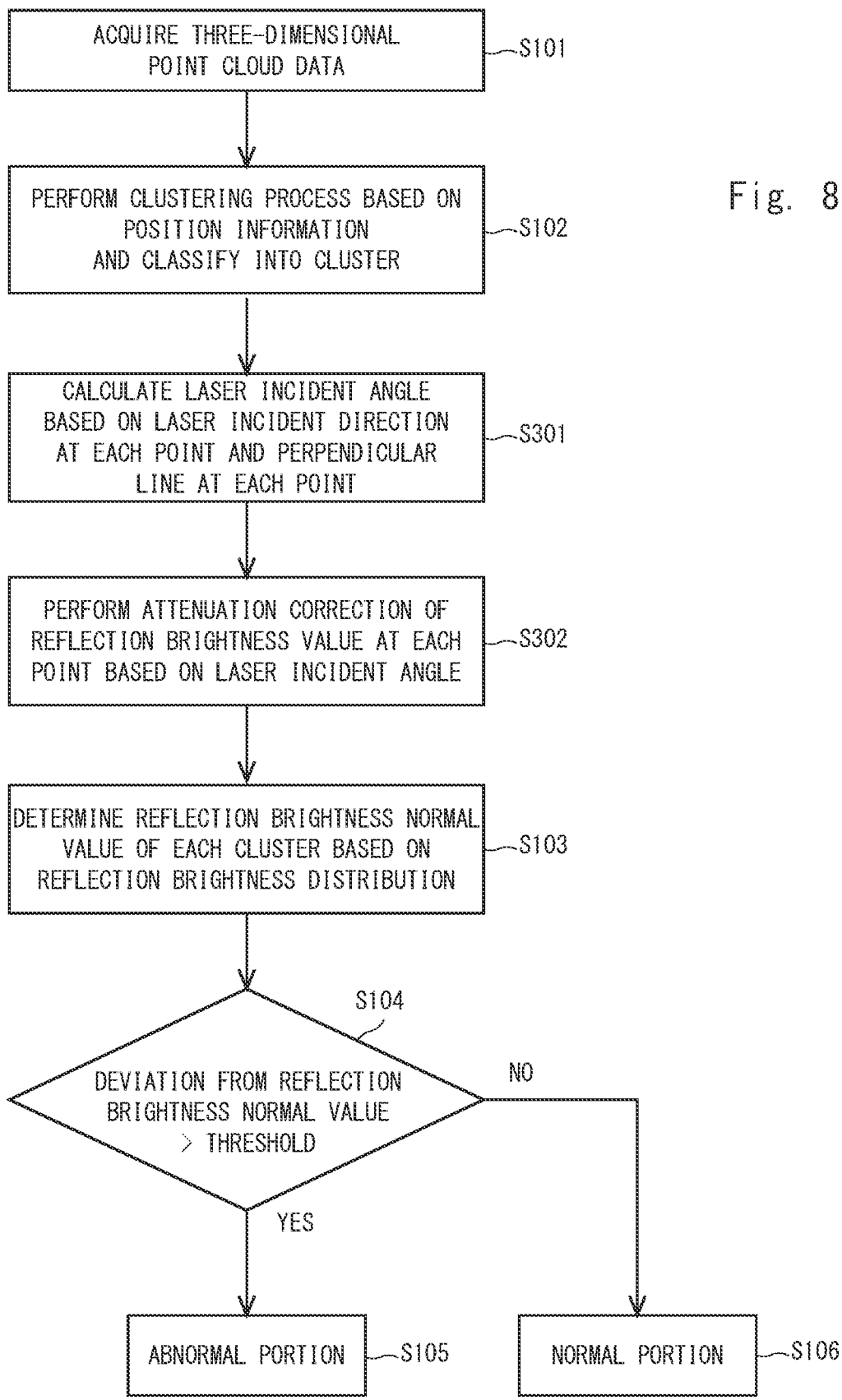
FIG. 8 is a flowchart illustrating an operation of a surface abnormality detection device according to the third example embodiment.

FIG. 8 is a flowchart illustrating the operation of the surface abnormality detection device according to the third example embodiment.

As illustrated in FIG. 8, the processes from step S101 to step S102 are performed in a similar manner to those in the first example embodiment. After step S102, the surface abnormality detection device 31 calculates (estimates) the laser incident angle A301 based on the laser incident direction at each point and the perpendicular line N301 at each point (step S301). When the perpendicular line N301 is calculated, the position of the point cloud may be smoothed to reduce the dispersion of the perpendicular line N301 due to an error of the distance measurement point P301.

The surface abnormality detection device 11 corrects (attenuates) the reflection brightness value at each point (distance measurement point) based on the laser incident angle A301 (step S302). The reflection brightness value may be corrected by applying the known reflectance property, other than modeling of the bidirectional reflectance distribution function of the structure, or simple modeling assuming Lambertian reflection.

After step S302, the processes from step S103 to step S106 are performed in a similar manner to those in the first example embodiment.

However, the example has been described in which step S301 and step S302 are performed between step S102 and step S103, but is not limited thereto. The sequence of processes may be arbitrary when the requirement that step S301 and step S302 are performed before step S103 is satisfied.

In this way, the surface abnormality detection device 31 according to the third example embodiment can identify the abnormal portion on the surface of the structure, in particular, the curved structure, with higher accuracy than in the surface abnormality detection device 11 according to the first example embodiment.

Fourth Example Embodiment

Figure 9:
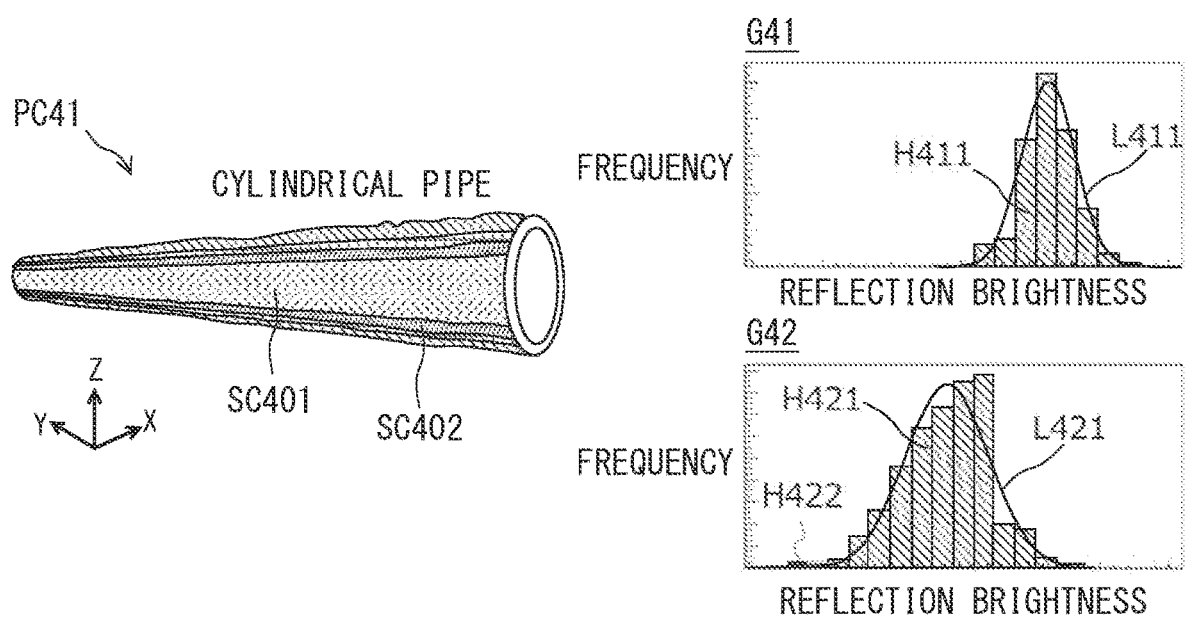
FIG. 9 is a diagram illustrating further classification (division) of a cluster based on a laser incident angle according to a fourth example embodiment.

FIG. 9 is a diagram illustrating further classification (division) of a cluster based on a laser incident angle according to a fourth example embodiment.

A point cloud PC41 illustrated in FIG. 9 is a point cloud on a cylindrical pipe.

A surface abnormality detection device 41 according to the fourth example embodiment identifies an abnormal portion by further dividing a point cloud in the cluster into point clouds having the same laser incident angle.

In the fourth example embodiment, the description will be made by way of example where a point cloud on a cylindrical pipe is used as the point cloud PC41.

As illustrated in FIG. 9, the surface abnormality detection device 41 according to the fourth example embodiment further classifies (divides) the cluster into subclusters according to the laser incident angle. For example, a subcluster SC401 into which the cluster is further classified includes a point cloud with a wide laser incident angle, and a subcluster SC402 includes a point cloud with a wide laser incident angle next to that of the subcluster SC401. In addition, a reflection brightness distribution G41 illustrated in FIG. 9 shows a histogram of reflection brightness values in the subcluster SC401. A reflection brightness distribution G42 illustrated in FIG. 9 shows a histogram of reflection brightness values in the subcluster SC402.

The surface abnormality detection device 41 according to the fourth example embodiment extracts the abnormal value of the reflection brightness from each of the reflection brightness distribution G41 and the reflection brightness distribution G42 in a similar manner to the surface abnormality detection device 11 according to the first example embodiment. That is, the surface abnormality detection device 41 extracts, from each of the reflection brightness distribution G41 and the reflection brightness distribution G42, the point cloud determined as the abnormal portion in which a difference between the reflection brightness value of the point cloud and the reflection brightness normal value exceeds the threshold. This makes it possible to identify a histogram H422 in which the reflection brightness becomes the abnormal value.

Specifically, with respect to the reflection brightness distribution G41 and the reflection brightness distribution G42, the reflection brightness distributions having the normal value are calculated as an approximate curve L411 and an approximate curve L421, respectively. A histogram H411 and a histogram H421 in which the reflection brightness value becomes the normal value are identified by calculating the approximate curve L411 and the approximate curve L421.

An operation of the surface abnormality detection device 41 according to the fourth example embodiment will be described.

Figure 10:
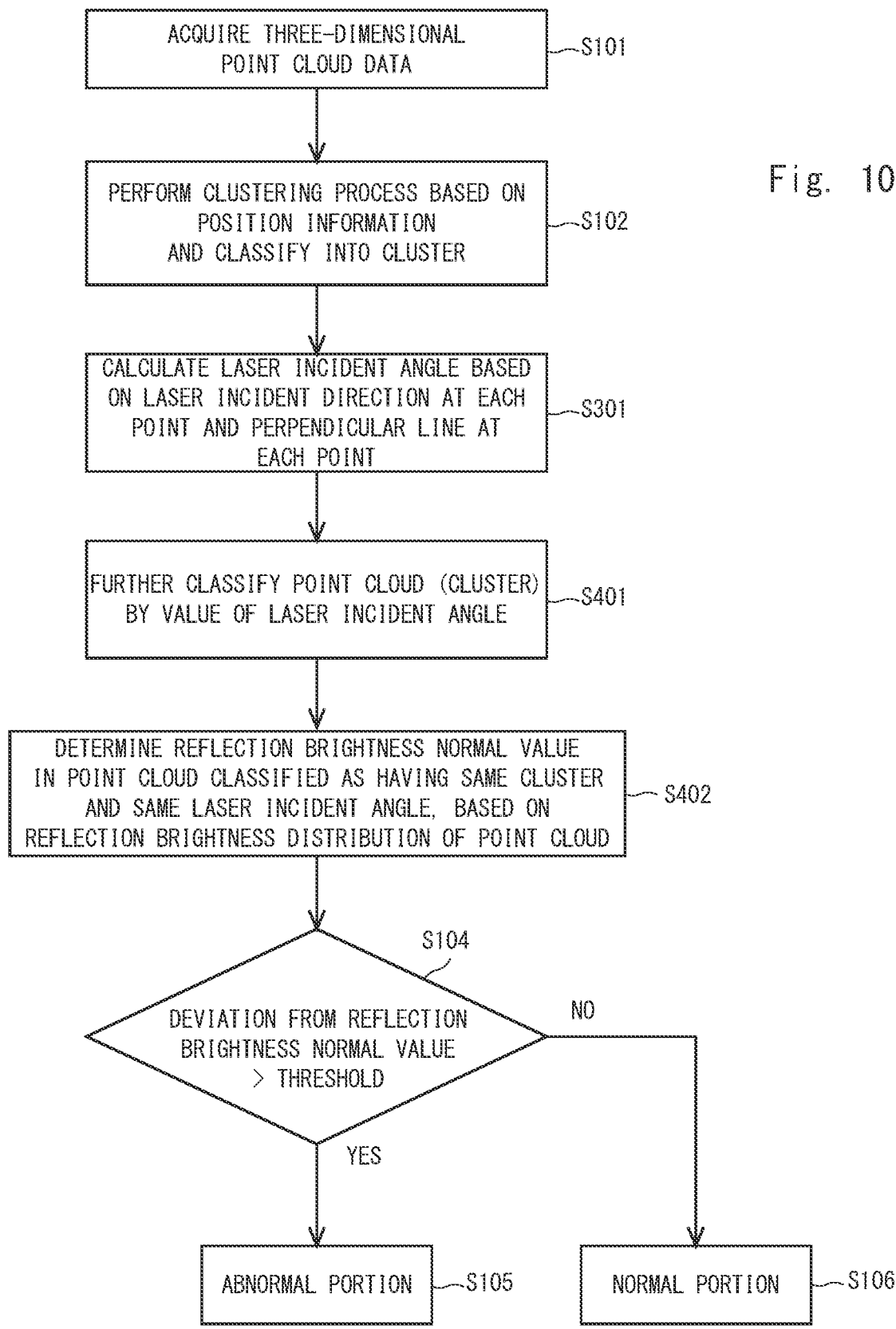
FIG. 10 is a flowchart illustrating an operation of a surface abnormality detection device according to the fourth example embodiment.

FIG. 10 is a flowchart illustrating the operation of the surface abnormality detection device according to the fourth example embodiment.

As illustrated in FIG. 10, the processes from step S101 to step S102 are performed in a similar manner to those in the first example embodiment. After step S102, step S301 is performed in a similar manner to that in the third example embodiment. After step S301, the surface abnormality detection device 41 further classifies the point cloud (cluster) classified as the same structure into the subclusters according to a value of the laser incident angle (step S404). For example, the surface abnormality detection device 41 further classifies the cluster into the subcluster for each angle range of the laser incident angles in the point cloud of the cluster. When there are a plurality of point clouds, each point cloud is further classified according to the value of the laser incident angle.

The point cloud may be further classified by a fixed width with respect to the value of the laser incident angle. Alternatively, the point cloud may be further classified by a width varying according to the reflection model or the number of points of the point cloud, with respect to the value of the laser incident angle.

The surface abnormality detection device 11 determines the normal value of the reflection brightness in each of the point clouds (subclusters) classified as being included in the same cluster (the same structure) and as having the same laser incident angle, based on the reflection brightness distribution of the point cloud (step S402).

After step S402, the processes from step S103 to step S106 are performed in a similar manner to those in the first example embodiment.

The surface abnormality detection device 11 finally identifies the abnormal portion on the surface of the further classified point cloud (subcluster) based on the difference between the reflection brightness normal value of the classified point cloud (subcluster) and the reflection brightness value at each of the plurality of points on the surface of the classified point cloud (subcluster).

However, the example has been described in which step S301 is performed between step S102 and step S401, but is not limited thereto. The sequence of processes may be arbitrary when the requirement that step S301 is performed before step S404 is satisfied.

In this way, the surface abnormality detection device 41 according to the fourth example embodiment can identify the abnormal portion on the surface with higher accuracy from the three-dimensional point cloud data having the reflection brightness in particular in a case where it is difficult to correct the reflection brightness using the laser incident angle with respect to the curved structure.

The surface abnormality detection device 41 according to the fourth example embodiment can identify the abnormal portion on the surface with higher accuracy than in the surface abnormality detection device 11 according to the third example embodiment.

Fifth Example Embodiment

A surface abnormality detection device 51 according to a fifth example embodiment can determine an abnormal portion on a surface with higher accuracy by using identification of the abnormal portion on the surface that is determined based on a red-green-blue (RGB) value in addition to the identification of the abnormal portion on the surface based on the reflection brightness.

An operation of the surface abnormality detection device 51 according to the fifth example embodiment will be described.

Figure 11:
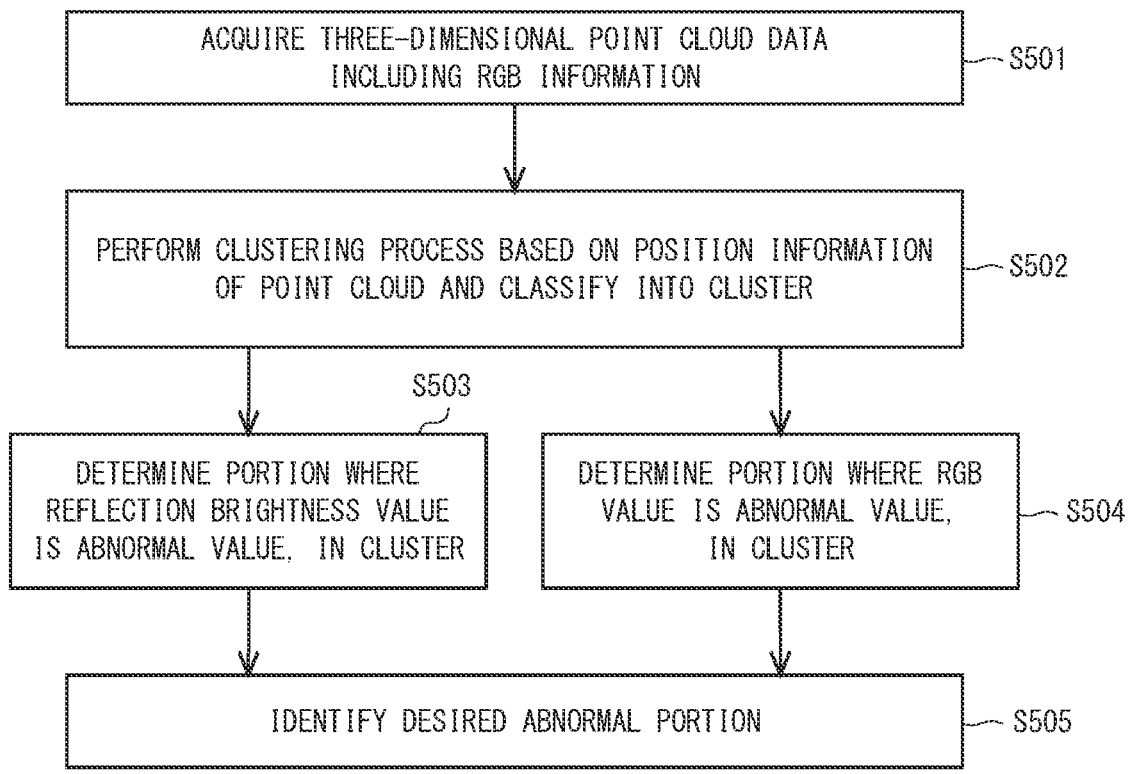
FIG. 11 is a flowchart illustrating an operation of a surface abnormality detection device according to a fifth example embodiment.

FIG. 11 is a flowchart illustrating the operation of the surface abnormality detection device according to the fifth example embodiment.

As illustrated in FIG. 11, the surface abnormality detection device 51 acquires three-dimensional point cloud data including RGB information (step S501).

The surface abnormality detection device 51 performs the clustering process based on the position information of the three-dimensional point cloud data, and classifies the three-dimensional point cloud data into the point cloud having the same structure, i.e., the cluster (step S502).

The surface abnormality detection device 51 determines the abnormal portion where the reflection brightness value becomes the abnormal value in the point cloud (cluster) classified as having the same structure, based on the reflection brightness distribution of the point cloud (step S503). When there are a plurality of point clouds, a portion where the reflection brightness value is abnormal is determined for each of the plurality of point clouds.

The surface abnormality detection device 51 determines a portion where the RGB value is abnormal in the point cloud classified as having the same structure, based on the RGB value of the point cloud (step S504). When there are a plurality of point clouds, a portion where the RGB value is abnormal is determined for each of the plurality of point clouds. The portion where the RGB value is abnormal may be determined in a similar procedure to step S503 after conversion to grayscale.

That is, the surface abnormality detection device 51 determines an RGB normal value of the cluster based on the distribution of the RGB values at the plurality of points on the surface of the point cloud (cluster). Then, the surface abnormality detection device 51 identifies the abnormal portion on the surface of the cluster based on the difference between the RGB normal value and the RGB value at each of the plurality of points on the surface of the cluster.

The surface abnormality detection device 51 identifies a desired abnormal portion based on the abnormal portion determined based on the reflection brightness and the abnormal portion determined based on the RGB value (step S505).

In step S505, the abnormal portion determined based on the reflection brightness and the abnormal portion determined based on the RGB value may be complementarily used.

Examples of a difference between the detection using the reflection brightness value and the detection using the RGB value include a rust fluid. The rust fluid is determined as the abnormal portion based on the RGB value, but is not determined as the abnormal portion based on the reflection brightness value. Therefore, the outflow source can be identified. The information can be used to identify the portion where the outflow source which is an original deterioration portion readily occurs, and an outflow path of the rust fluid, thereby enabling selection and determination of the appropriate repair method according to the degree of abnormality.

In this way, the surface abnormality detection device 51 according to the fifth example embodiment can determine the abnormal portion on the surface with higher accuracy from the three-dimensional point cloud data having the reflection brightness value and the RGB value.

Sixth Example Embodiment

A surface abnormality detection device 61 according to a sixth example embodiment can further improve the accuracy with which an abnormal portion on a surface is determined (identified), using the identification of an abnormal portion on the surface which is determined based on the roughness, in addition to the identification of an abnormal portion on the surface based on a reflection brightness value.

For example, the spatial surface roughness can be calculated as a displacement of the point cloud from the smoothed surface. The abnormality on the surface that is rougher than the accuracy of the distance measurement device 12 can be identified by identifying the abnormal portion on the surface based on the roughness. The abnormal portion on the surface can be complementarily identified by using the portion where the reflection brightness is abnormal and the portion where the roughness is abnormal.

An operation of the surface abnormality detection device 61 according to the sixth example embodiment will be described.

Figure 12:
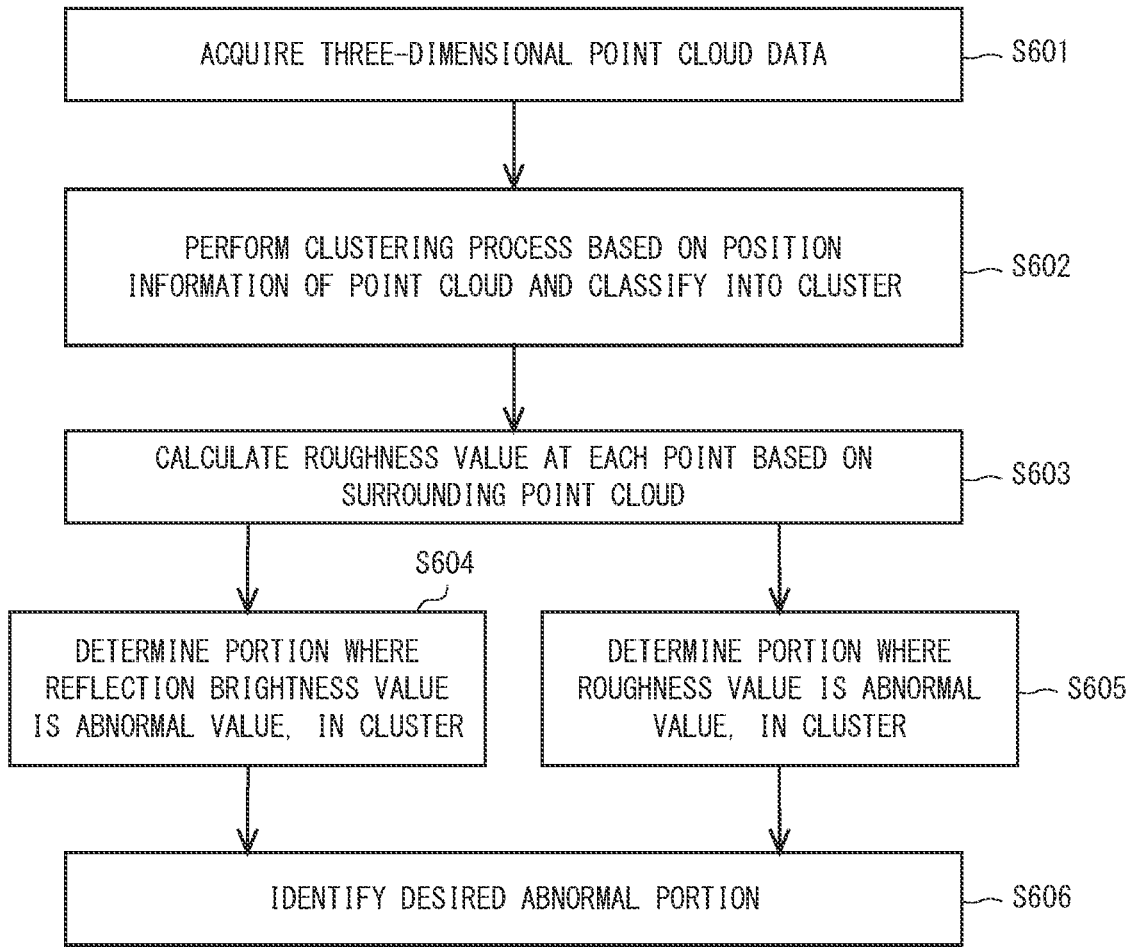
FIG. 12 is a flowchart illustrating an operation of a surface abnormality detection device according to a sixth example embodiment.

FIG. 12 is a flowchart illustrating the operation of the surface abnormality detection device according to the sixth example embodiment.

As illustrated in FIG. 12, the surface abnormality detection device 61 acquires three-dimensional point cloud data (step S601).

The surface abnormality detection device 61 performs the clustering process based on the position information of the three-dimensional point cloud data, and classifies the three-dimensional point cloud data into the point cloud having the same structure, i.e., the cluster (step S602).

The surface abnormality detection device 61 calculates a roughness value at each point based on the surrounding point cloud (step S603). That is, the surface abnormality detection device 61 calculates the roughness value at each of the plurality of points on the surface of the cluster based on the position information at the plurality of points on the surface of the cluster. For example, the smoothed surface is calculated based on the point cloud in the surroundings of an arbitrary point P, and the displacement of the point P from the smoothed surface is calculated as the roughness value of the point P.

The surface abnormality detection device 61 determines the abnormal portion where the reflection brightness value becomes the abnormal value in the point cloud (cluster) classified as having the same structure, based on the reflection brightness distribution of the point cloud (step S604).

The surface abnormality detection device 61 determines the portion where the roughness value is abnormal in the point cloud classified as having the same structure, based on the roughness value of the point cloud (step S605). When there are a plurality of point clouds, a portion where the roughness value is abnormal is determined for each of the plurality of point clouds.

That is, the surface abnormality detection device 61 determines a roughness normal value of the cluster based on the distribution of the roughness values at the plurality of points on the surface of the cluster. Then, the surface abnormality detection device 61 identifies the abnormal portion on the surface of the cluster based on the difference between the roughness normal value and the roughness value at each of the plurality of points on the surface of the cluster.

The surface abnormality detection device 61 identifies a desired abnormal portion based on the abnormal portion determined based on the reflection brightness value and the abnormal portion determined based on the roughness value (step S606).

In step S606, the abnormal portion determined based on the reflection brightness and the abnormal portion determined based on the roughness value may be complementarily used.

Examples of a difference between the detection using the reflection brightness value and the detection using the roughness value include lifting of coating due to internal corrosion. The lifting of coating causes no change to the reflection brightness value since paint remains, but is detected as the roughness value. The information can be used to identify the penetration range of corrosion from the internal corrosion portion connected to the rust exposed to the outside, thereby enabling selection and determination of the appropriate repair method.

In this way, the surface abnormality detection device 61 according to the sixth example embodiment can generally determine the abnormal portion on the surface, even with respect to the target (structure) that is rougher than the accuracy of the distance measurement device 12.

Seventh Example Embodiment

Figure 13:
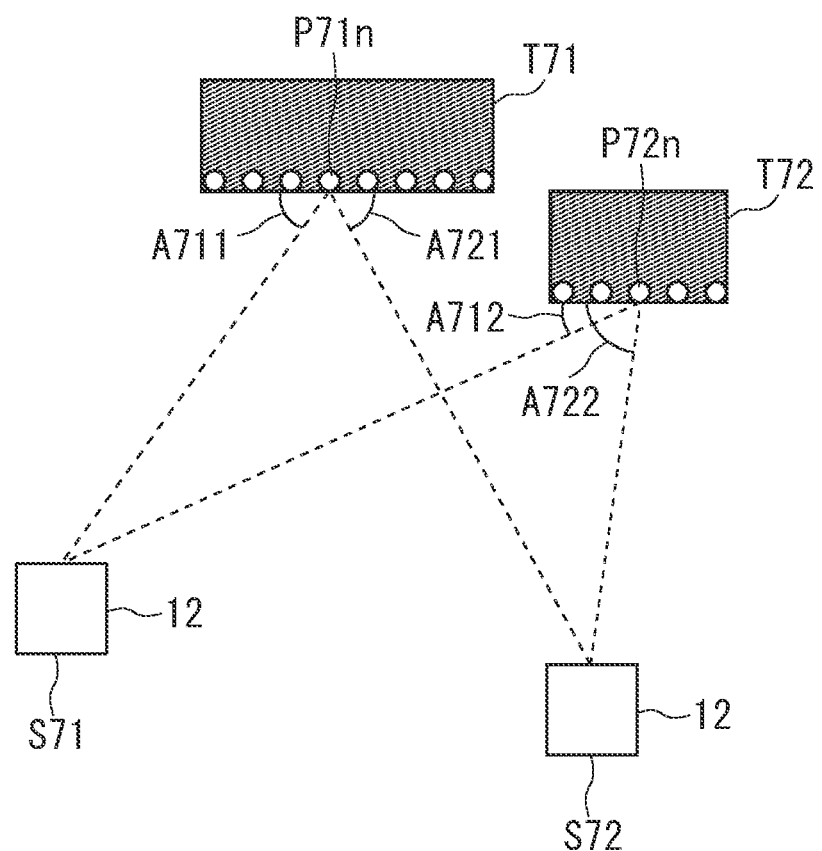
FIG. 13 is a diagram illustrating a distance measurement device and an object under measurement according to a seventh example embodiment.

FIG. 13 is a diagram illustrating a distance measurement device and an object under measurement according to a seventh example embodiment. Here, an operation of identifying an abnormal portion on a surface using the point cloud data obtained by capturing images from a plurality of viewpoints will be described with reference to FIG. 13.

FIG. 13 illustrates an object under measurement T71 and an object under measurement T72, the images of which are captured with a distance measurement device 12 installed at a first observation point S71. In addition, FIG. 13 illustrates the object under measurement T71 and the object under measurement T72, the images of which are captured with a distance measurement device 12 installed at a second observation point S72.

As illustrated in FIG. 13, the data (information) at a distance measurement point P71n on the surface of the object under measurement T71 is acquired by the distance measurement device 12 installed at each of the first observation point S71 and the second observation point S72. In addition, the data (information) at a distance measurement point P72n on the surface of the object under measurement T72 is acquired by the distance measurement device 12 installed at each of the first observation point S71 and the second observation point S72.

At this time, with respect to the distance measurement point P71n, the measurement is made at a laser incident angle A711 from the first observation point S71, and the measurement is made at a laser incident angle A712 from the second observation point S72. Similarly, with respect to the distance measurement point P72n, the measurement is made at a laser incident angle A721 from the first observation point S71, and the measurement is made at a laser incident angle A722 from the second observation point S72.

In the case where an image of the object under measurement T71 is captured from the first observation point S71 and the second observation point S72, the laser incident angle on the distance measurement point P71n from the first observation point S71 is different from that from the second observation point S72, and therefore the reflection brightness value varies depending on the observation point. The same is true for the case where an image of the measure target T72 is captured from the first observation point S71 and the second observation point S72.

In the seventh example embodiment, the abnormal portion on the surface is identified by focusing on the fact that the isotropic nature of the reflected light varies depending on the surface roughness.

In the case where the surface of the object under measurement is rough due to the deterioration such as rust, the laser reflected light tends to spread isotropically, and therefore a laser incident angle-dependent change in the reflection brightness value is small. On the other hand, in the case where the surface of the object under measurement is protected by the paint or the like, the laser reflected light has a large reflection brightness value in a direction of specular reflection, and therefore a laser incident angle-dependent change in the reflection brightness value is large.

The abnormal portion on the surface of each of the measure target T71 and the object under measurement T72 can be identified using a difference in reflection brightness acquired by the first observation point S71 and the second observation point S72, and a difference in laser incident angle. Here, the difference in reflection brightness is a difference between the reflection brightness at a predetermined distance measurement point (e.g., the distance measurement point P71n) acquired by the first observation point S71 and the reflection brightness at the predetermined distance measurement point acquired by the second observation point S72. In addition, the difference in laser incident angle is a difference between the laser incident angle on the predetermined distance measurement point from the first observation point S71 and the laser incident angle on the predetermined distance measurement point from the second observation point S72.

In the point cloud data of the images captured by the first observation point S71 and the second observation point S72, the positions of the object under measurement T71 and the object under measurement T72 are associated with the shapes thereof by position matching and recognition, respectively, and then the difference in reflection brightness and the difference in laser incident angle are calculated, whereby the abnormal portion on the surfaces is identified.

However, the example has been described in which the reflection brightness at the same distance measurement point P71$n$ (or P72$n$) is acquired from the first observation point S71 and the second observation point S72, but is not limited thereto. For example, in the case where the distance measurement point P71$n$ can be acquired by the first observation point S71, but the distance measurement point P71$n$ cannot be acquired by the second observation point S72, a neighboring point of the distance measurement point P71$n$ or interpolation points of the reflection brightness and the laser incident angle at the distance measurement point P71$n$ may be used.

An overview of the surface abnormality detection device 71 according to the seventh example embodiment will be described.

Figure 14:
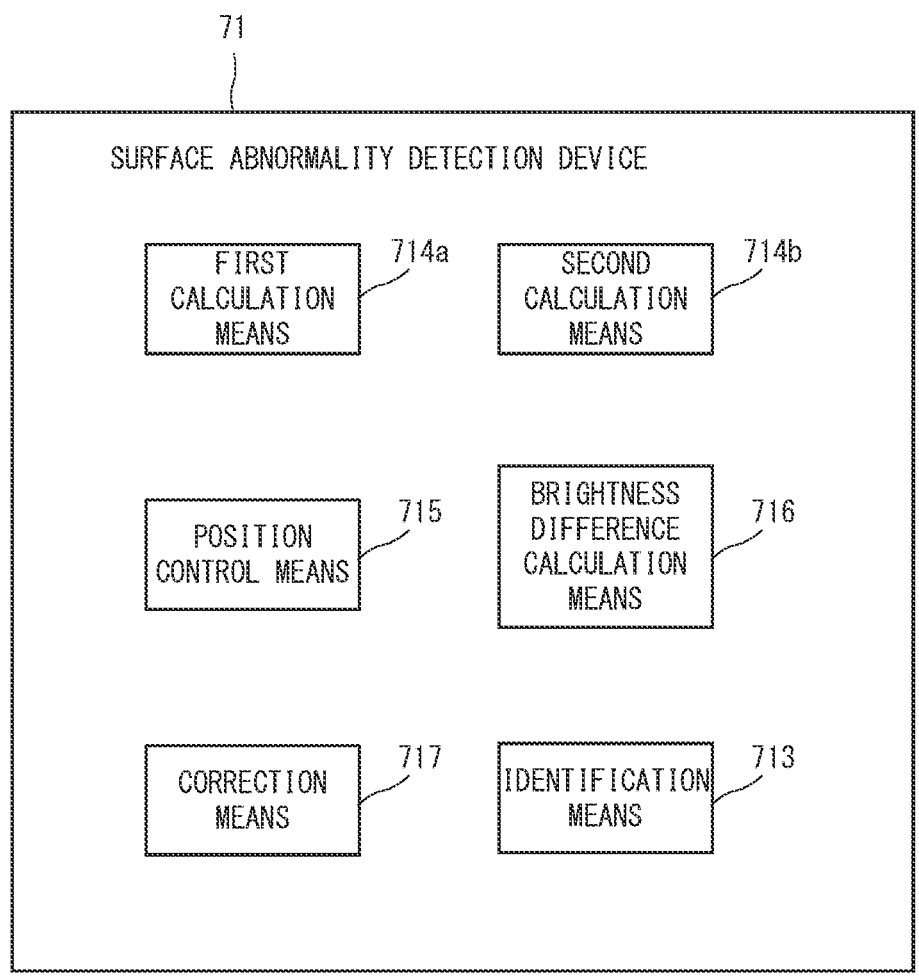
FIG. 14 is a block diagram illustrating a surface abnormality detection device according to the seventh example embodiment.

FIG. 14 is a block diagram illustrating the surface abnormality detection device according to the seventh example embodiment.

As illustrated in FIG. 14, the surface abnormality detection device 71 according to the seventh example embodiment includes a first calculation means 714$a$, a second calculation means 714$b$, a position control means 715, a brightness difference calculation means 716, a correction means 717, and an identification means 713.

The first calculation means 714$a$ calculates a first incident angle of the laser for each of the plurality of distance measurement points based on the position information of the first observation point S71 and the position information of the plurality of distance measurement points on the surface of the object under measurement. The position information of the first observation point S71 is included in first point cloud data. The first calculation means 714$a$ calculates the first incident angle at the distance measurement point based on a direction connecting a distance measurement point on the surface of the object under measurement and the first observation point S71, and a perpendicular line at the distance measurement point.

The second calculation means 714$b$ calculates a second incident angle of the laser for each of the plurality of distance measurement points based on the position information of the second observation point S72 and the position information of the plurality of distance measurement points included in the second point cloud data. The second calculation means 714$b$ calculates the second incident angle at a distance measurement point based on a direction connecting the distance measurement point on the surface of the object under measurement and the second observation point S72, and a perpendicular line at the distance measurement point.

The position control means 715 adjusts to match the positions for each of the plurality of distance measurement points based on the position information of the plurality of distance measurement points in the first point cloud data and the position information of the plurality of distance measurement points in the second point cloud data.

The brightness difference calculation means 716 calculates, for each of the plurality of distance measurement points, a reflection brightness difference value which is a difference between a first reflection brightness value at each of the plurality of distance measurement points in the first point cloud data after the position adjustment and a second reflection brightness value at each of the plurality of distance measurement points in the second point cloud data after the position adjustment.

The correction means 717 calculates, for each of the plurality of distance measurement points, an incident angle difference which is a difference between the first incident angle at each of the plurality of distance measurement points in the first point cloud data after the position adjustment and the second incident angle at each of the plurality of distance measurement points in the second point cloud data after the position adjustment. The correction means 717 corrects, for each of the plurality of distance measurement points, the reflection brightness difference value based on the calculated incident angle difference.

The identification means 713 identifies an abnormal portion of the object under measurement based on the reflection brightness difference value after correction.

An operation of the surface abnormality detection device 71 according to the seventh example embodiment will be described.

Figure 15:
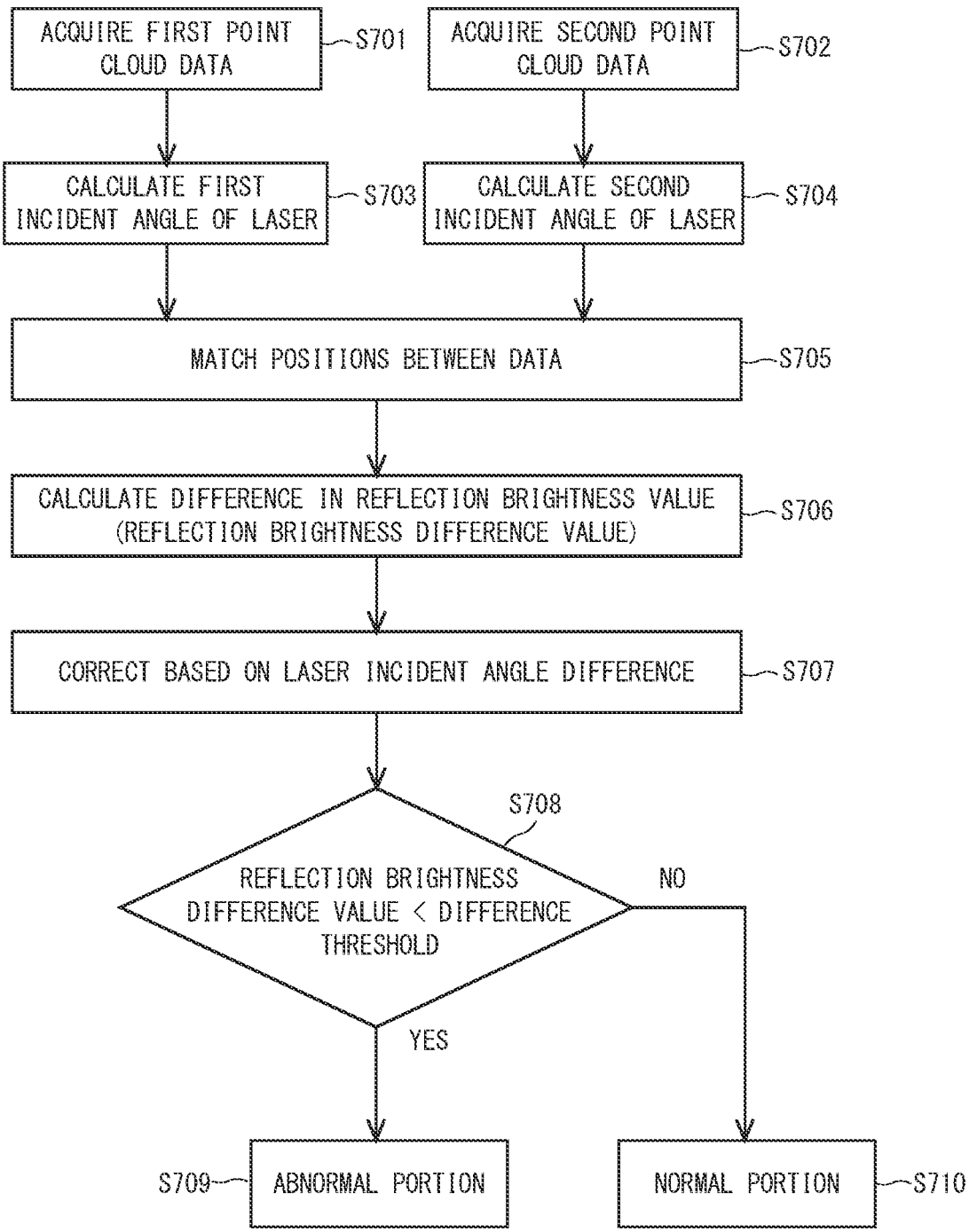
FIG. 15 is a flowchart illustrating an operation of the surface abnormality detection device according to the seventh example embodiment.

FIG. 15 is a flowchart illustrating the operation of the surface abnormality detection device according to the seventh example embodiment.

In the following description of the example embodiment, the three-dimensional point cloud data of the image captured by the first observation point S71 is referred to as the first point cloud data, and the three-dimensional point cloud data of the image captured by the second observation point S72 is referred to as the second point cloud data.

As illustrated in FIG. 15, the surface abnormality detection device 71 acquires the first point cloud data (step S701). The surface abnormality detection device 71 acquires the second point cloud data (step S702).

The surface abnormality detection device 71 calculates, with respect to the first point cloud data, the first incident angle of the laser at each distance measurement point based on the point cloud and the position information of the first observation point S71 (step S703). The surface abnormality detection device 11 calculates, with respect to the second point cloud data, the second incident angle of the laser at each distance measurement point based on the point cloud and the position information of the second observation point S72 (step S704). The laser incident angle is calculated as described in the third example embodiment, for example.

The surface abnormality detection device 71 performs the position matching between the first point cloud data and the second point cloud data, or the position matching between the first point cloud data and the second point cloud data by shape identification (step S705).

The surface abnormality detection device 71 calculates a difference in reflection brightness value between the distance measurement points corresponding to each other (step S706). The difference in reflection brightness may be calculated using the points closest to each other in the corresponding point cloud, or an interpolated value at the corresponding position. In addition, the surface abnormality detection device 71 also calculates a difference in laser incident angle between the distance measurement points. The difference in reflection brightness is referred to as a reflection brightness difference or a reflection brightness difference value.

The surface abnormality detection device 71 corrects the reflection brightness difference value based on the laser incident angle difference calculated in step S706 (step S707). The laser incident angle difference may be calculated using the points closest to each other in the corresponding point cloud, or an interpolated value at the corresponding position.

The reflection brightness difference value may be corrected by applying the known reflectance property, other than modeling of the bidirectional reflectance distribution function of the object under measurement, or simple modeling assuming Lambertian reflection.

When the reflection brightness difference value of a point cloud is below a difference threshold (step S708: YES), the surface abnormality detection device 71 determines the point cloud as an abnormal portion on the surface (step S709).

When the reflection brightness difference value of a point cloud exceeds the difference threshold (step S708: NO), the surface abnormality detection device 71 determines the point cloud as a normal portion on the surface (step S710).

In this way, the surface abnormality detection device 71 according to the seventh example embodiment can identify the abnormal portion on the surface with higher accuracy from the three-dimensional point cloud data of the images captured from a plurality of points.

Eighth Example Embodiment

A surface abnormality detection device 81 according to an eighth example embodiment is different from the surface abnormality detection device 71 according to the seventh example embodiment in that an abnormal portion on the surface is identified by comparison to the three-dimensional point cloud data measured in the past, whereby the accuracy is improved.

In the description of the eighth example embodiment, the three-dimensional point cloud data for comparison measured in the past is referred to as "three-dimensional point cloud data (comparison)" or cloud data for comparison, and the three-dimensional point cloud data for evaluation for determining the abnormality is referred to as "three-dimensional point cloud data (evaluation)" or cloud data for evaluation.

The simplest method of comparing the three-dimensional point cloud data (comparison) with the three-dimensional point cloud data (evaluation) is a method of acquiring a reflection brightness difference value of the point cloud using the point of closest proximity between the point clouds or the interpolation.

An overview of the surface abnormality detection device 81 according to the eighth example embodiment will be described.

Figure 16:
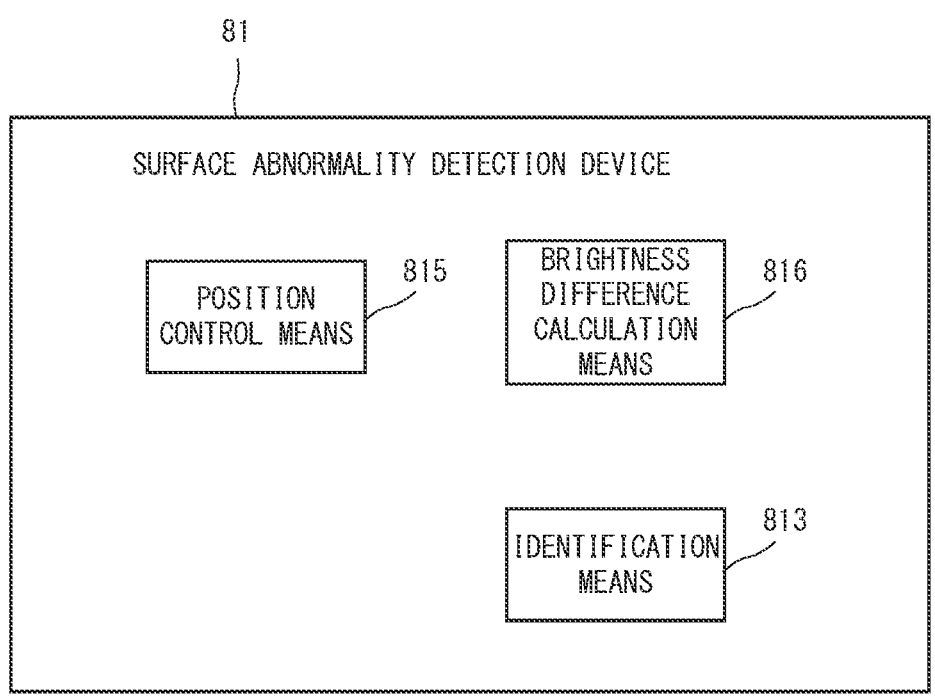
FIG. 16 is a block diagram illustrating a surface abnormality detection device according to an eighth example embodiment.

FIG. 16 is a block diagram illustrating the surface abnormality detection device according to the eighth example embodiment.

As illustrated in FIG. 16, the surface abnormality detection device 81 according to the eighth example embodiment includes a position control means 815, a brightness difference calculation means 816, and an identification means 813.

In the cloud data for evaluation, the position information of a plurality of distance measurement points on the surface of the object under measurement is included. Also in the cloud data for comparison, the position information of a plurality of distance measurement points on the surface of the object under measurement is included. The position control means 815 adjusts to match the positions for each of the plurality of distance measurement points based on the position information of the plurality of distance measurement points included in the cloud data for evaluation and the position information of the plurality of distance measurement points included in the cloud data for comparison.

The brightness difference calculation means 816 calculates, for each of the plurality of distance measurement points, a reflection brightness difference value which is a difference between a reflection brightness value for evaluation at each of the plurality of distance measurement points in the cloud data for evaluation after the position adjustment and a reflection brightness value for comparison at each of the plurality of distance measurement points in the cloud data for comparison after the position adjustment.

The identification means 813 identifies an abnormal portion of the object under measurement based on the reflection brightness difference value.

In the following description of the eighth example embodiment, as a method of identifying the abnormal portion on the surface with higher accuracy, a method of determining the abnormal portion on a per cluster basis, based on the position information of the point cloud will be described as an example.

Specifically, a normal value of the reflection brightness value is determined on a per cluster basis from the three-dimensional point cloud data (comparison), the clusters are associated with each other between the point clouds, and a deviation value of the reflection brightness value is determined as a difference between a reflection brightness value of the three-dimensional point cloud data (evaluation) and the reflection brightness normal value of the corresponding cluster, to thereby identify the abnormal portion. For example, in the case where when two point clouds are measured, the distance measurement point is changed due to an observation point error, or the like, the reflection brightness value may change. In such a case, the error can be reduced by processing the reflection brightness value on a per cluster basis.

An operation of the surface abnormality detection device 81 according to the eighth example embodiment will be described.

Figure 17:
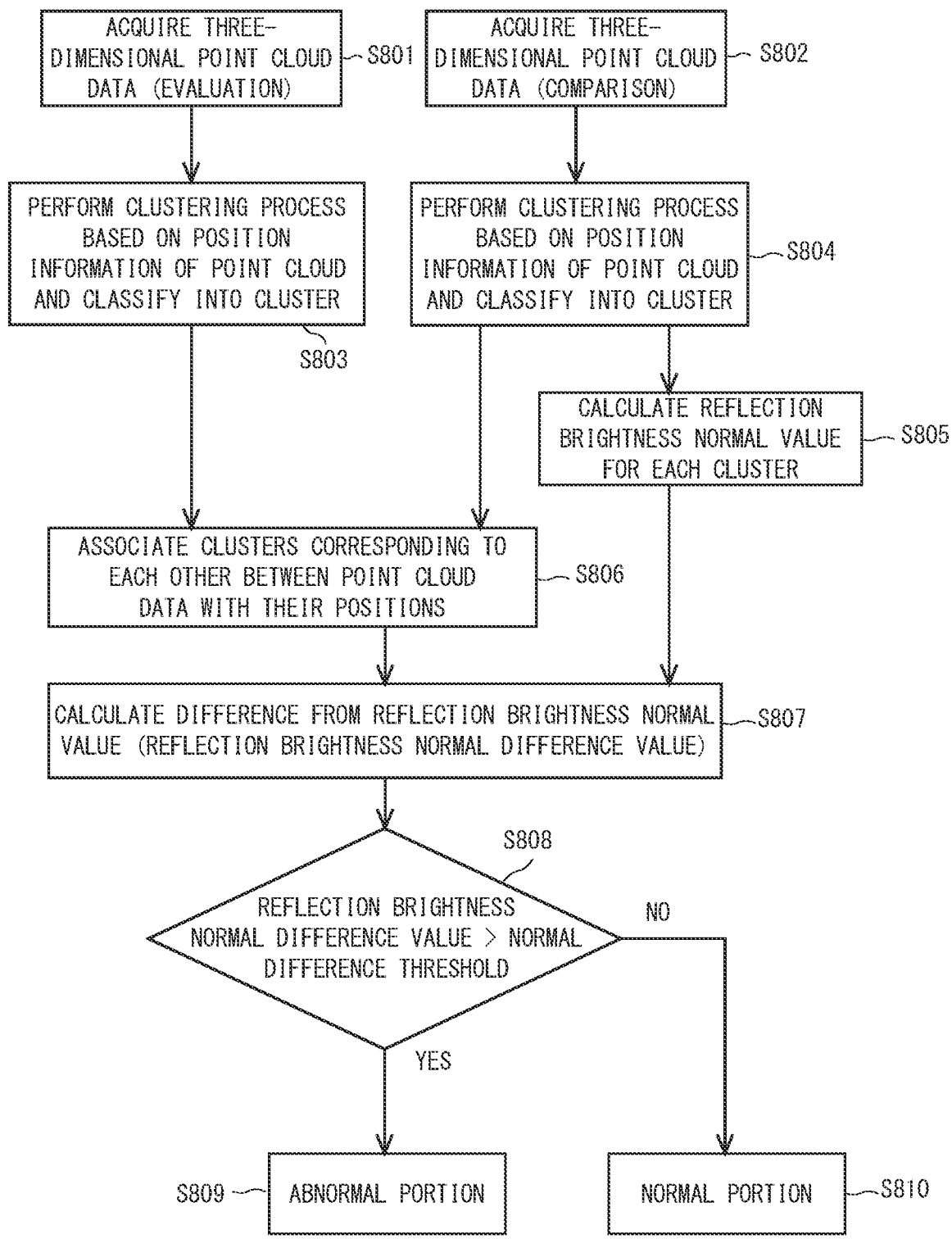
FIG. 17 is a flowchart illustrating an operation of the surface abnormality detection device according to the eighth example embodiment.

FIG. 17 is a flowchart illustrating the operation of the surface abnormality detection device according to the eighth example embodiment.

As illustrated in FIG. 17, the surface abnormality detection device 81 acquires the three-dimensional point cloud data (evaluation) (step S801). The surface abnormality detection device 81 acquires the three-dimensional point cloud data (comparison) (step S802).

The surface abnormality detection device 81 performs the clustering process based on the position information of the point cloud with respect to the three-dimensional point cloud data (evaluation), and classifies the three-dimensional point cloud data (evaluation) into the point cloud having the same structure, i.e., the cluster (step S803). That is, the surface abnormality detection device 81 classifies the object under measurement into one or more clusters having the same structure, based on the position information at the plurality of distance measurement points on the surface of the object under measurement included in the three-dimensional point cloud data (evaluation).

The surface abnormality detection device 81 performs the clustering process based on the position information of the point cloud with respect to the three-dimensional point cloud data (comparison), and classifies the three-dimensional point cloud data (comparison) into the point cloud having the same structure, i.e., the cluster (step S804). That is, the surface abnormality detection device 81 classifies the object under measurement into one or more clusters having the same structure, based on the position information at the plurality of distance measurement points on the surface of the object under measurement included in the three-dimensional point cloud data (comparison).

The surface abnormality detection device 81 calculates the normal value of the reflection brightness (reflection brightness normal value) for each classified cluster in step S804 (step S805). That is, the surface abnormality detection device 81 determines the reflection brightness normal value for each cluster of the three-dimensional point cloud data (comparison) based on the distribution of the reflection brightness values in the plurality of distance measurement points of the cluster of the three-dimensional point cloud data (comparison).

The surface abnormality detection device 81 associates the clusters corresponding to each other between the three-dimensional point cloud data (evaluation) and the three-dimensional point cloud data (comparison) with the positions, respectively, by position matching between the two pieces of three-dimensional point cloud data or shape identification of the clusters (step S806). That is, the surface abnormality detection device 81 associates the cluster of the three-dimensional point cloud data (evaluation) with the cluster of the three-dimensional point cloud data (comparison) recognized as having the same structure, based on the position information of the plurality of distance measurement points of the cluster of the three-dimensional point cloud data (evaluation) and the position information of the plurality of distance measurement points of the cluster of the three-dimensional point cloud data (comparison).

The surface abnormality detection device 81 calculates a difference from the reflection brightness normal value based on the reflection brightness normal value calculated in step S805 (step S807). The difference from the reflection brightness normal value is referred to as a reflection brightness normal difference value. That is, the surface abnormality detection device 81 calculates the reflection brightness normal difference value which is a difference between the reflection brightness value at each of the plurality of distance measurement points of the cluster of the three-dimensional point cloud data (evaluation) and the reflection brightness normal value of the cluster of the three-dimensional point cloud data (comparison) corresponding to the cluster of the three-dimensional point cloud data (evaluation).

When the reflection brightness normal difference value of a point cloud exceeds a normal difference threshold (step S808: YES), the surface abnormality detection device 81 determines the point cloud as an abnormal portion on the surface (step S809). That is, the surface abnormality detection device 81 identifies, for each cluster, the abnormal portion on the surface of the object under measurement based on the reflection brightness normal difference value.

When the reflection brightness normal difference value of a point cloud is below the normal difference threshold (step S808: NO), the surface abnormality detection device 81 determines the point cloud as an abnormal portion on the surface (step S810).

In this way, the surface abnormality detection device 81 according to the eighth example embodiment can identify the abnormal portion on the surface with higher accuracy from the comparison with the three-dimensional point cloud data of the image captured in the past.

Ninth Example Embodiment

Figure 18:
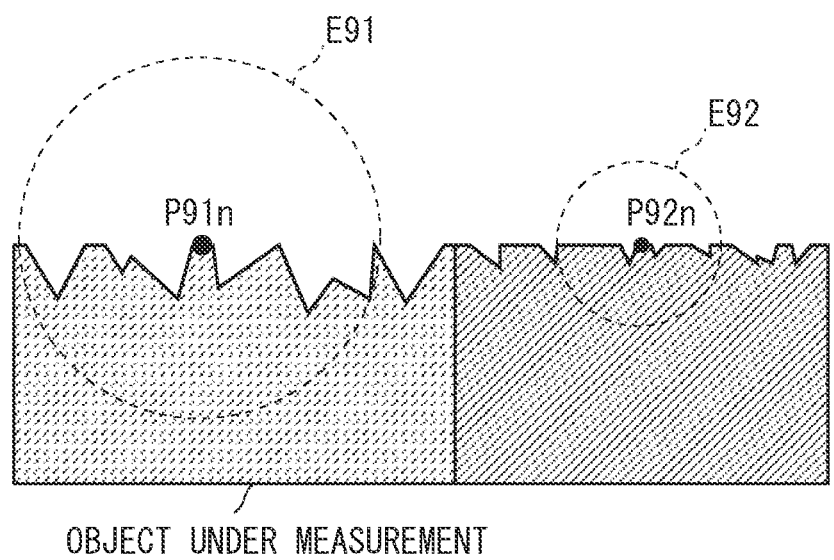
FIG. 18 is a schematic view illustrating a cross section of a neighboring region of a distance measurement point of an object under measurement.

FIG. 18 is a schematic view illustrating a cross section of a neighboring region of a distance measurement point of an object under measurement.

Figure 19:
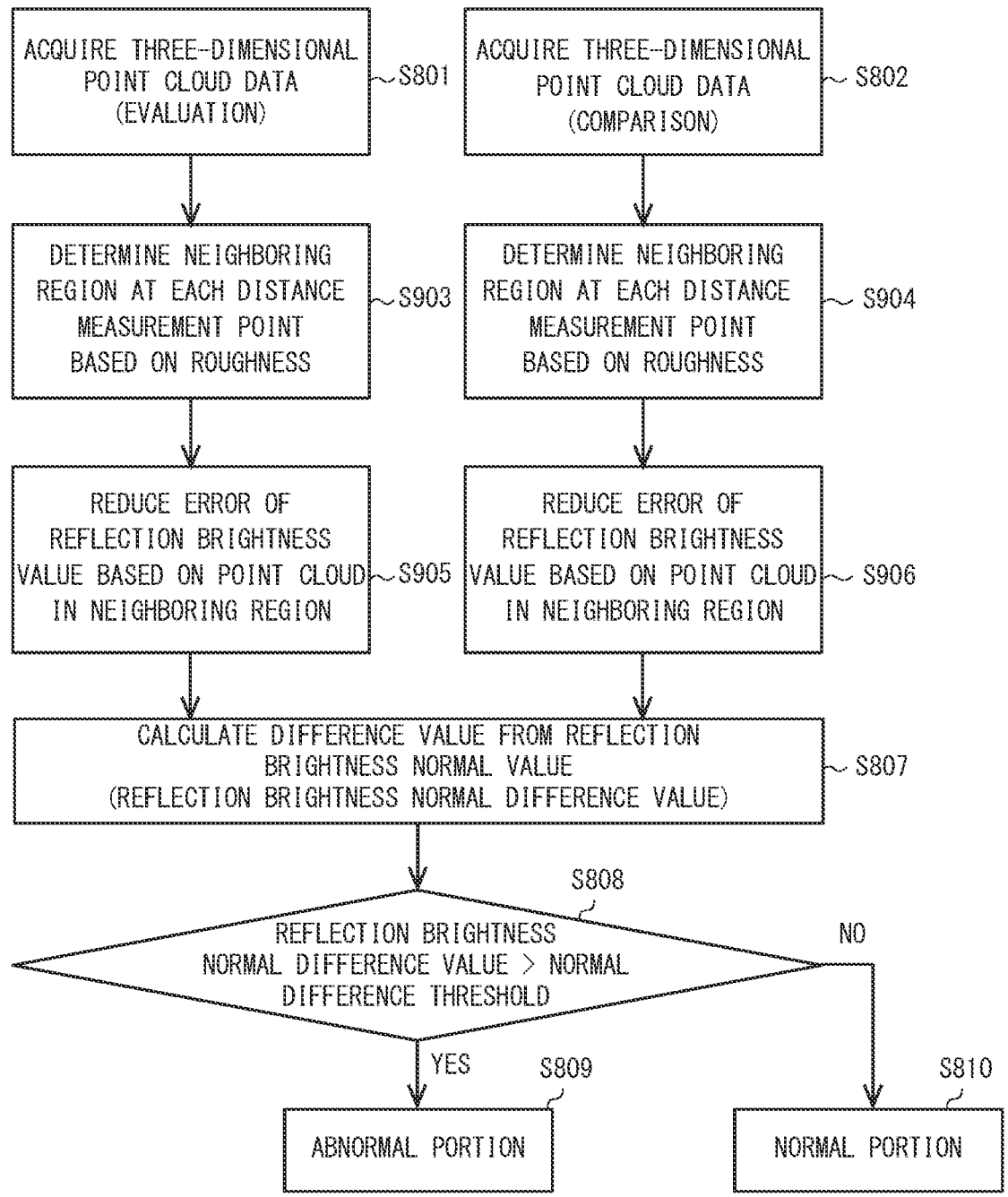
FIG. 19 is a flowchart illustrating an operation of a surface abnormality detection device according to a ninth example embodiment.

FIG. 19 is a flowchart illustrating an operation of a surface abnormality detection device according to a ninth example embodiment.

<Correction by Roughness>

As illustrated in FIG. 18, the vicinity of a distance measurement point P91n on the surface of the object under measurement is rough. When the surface is rough, a roughness value becomes large, and an error of the reflection brightness value becomes large. On the other hand, the vicinity of a distance measurement point P92n on the surface of the object under measurement is not rough (is smooth). When the surface is not rough, the roughness value becomes small, and the error of the reflection brightness value becomes small.

Here, in the case where the cloud data for evaluation and the cloud data for comparison in the eighth example embodiment do not have the same distance measurement points, the reflection brightness value changes due to unevenness of the surface of the object under measurement. In addition, the reflection brightness value changes even due to the device-specific measurement error of the reflection brightness value. As a result, when the surface abnormality detection device identifies the abnormal portion of the object under measurement based on the reflection brightness value, the reflection brightness value may include an error depending on the state of the surface of the object under measurement. In the case where the reflection brightness value includes a noise, the surface abnormality detection device may falsely detect the abnormal portion on the surface.

In the case where the surface of the object under measurement is rough, the surface abnormality detection device 91 averages the reflection brightness values at the distance measurement points in a wide range to reduce the error. Alternatively, in the case where the surface of the object under measurement is smooth, the range where the reflection brightness values are averaged is narrowed. That is, when the roughness value becomes large, the neighboring region is increased, when the roughness value becomes small, the neighboring region is reduced. This can remove the error of the reflection brightness value caused by the unevenness of the surface of the object under measurement.

Specifically, the surface abnormality detection device 91 obtains the reflection brightness value at the distance measurement point P91n on the surface of the object under measurement by averaging the reflection brightness values at the distance measurement points in a surrounding neighboring region E91. That is, the surface abnormality detection device 91 is different from the surface abnormality detection device 81 according to the eighth example embodiment in that an operation of correcting the reflection brightness value at the distance measurement point P91n based on the distance measurement points present in the neighboring region E91 in the surroundings of the distance measurement point P91n is added.

More specifically, as illustrated in FIG. 19, after step S801, the brightness difference calculation means 716 calculates a first roughness value based on the position information of the distance measurement points of the cloud data for evaluation. The brightness difference calculation means 716 determines a first neighboring region of the distance measurement points of the cloud data for evaluation based on the first roughness value (step S903).

The brightness difference calculation means 716 calculates a first reflection brightness value in a first neighborhood based on the distance measurement points (point cloud) of the cloud data for evaluation in the first neighboring region. For example, the brightness difference calculation means 716 calculates the first reflection brightness value in the first neighborhood by averaging the reflection brightness values of the plurality of distance measurement points of the cloud data for evaluation in the first neighboring region. The brightness difference calculation means 716 regards the first reflection brightness value in the first neighborhood as the reflection brightness value for evaluation, thereby reducing the error of the reflection brightness value for evaluation (step S905). As a result, the abnormal portion on the surface of the object under measurement can be identified with higher accuracy. However, when the object under measurement is classified into the cluster, the first reflection brightness value in the first neighborhood may be regarded as the reflection brightness value at the plurality of distance measurement points of the cluster of the cloud data for evaluation.

The brightness difference calculation means 716 calculates a second roughness value based on the position information of the distance measurement points of the cloud data for comparison. The brightness difference calculation means 716 determines a second neighboring region of the distance measurement points of the cloud data for comparison based on the second roughness value (step S904).

The brightness difference calculation means 716 calculates a second reflection brightness value in a second neighborhood based on the distance measurement points (point cloud) of the cloud data for comparison in the second neighboring region. The brightness difference calculation means 716 regards the second reflection brightness value in the second neighborhood as the reflection brightness value for comparison, thereby reducing the error of the reflection brightness value for comparison (step S906). However, when the object under measurement is classified into the cluster, the second reflection brightness value in the second neighborhood may be regarded as the reflection brightness value at the plurality of distance measurement points of the cluster of the cloud data for comparison. The first neighboring region and the second neighboring region are collectively referred to as a neighboring region in some cases.

Figure 20:
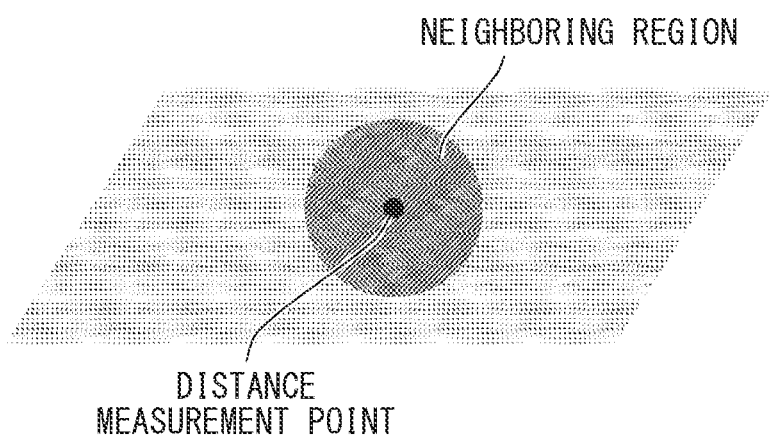
FIG. 20 is a schematic view illustrating a neighboring region for each of cloud data for evaluation and cloud data for comparison.
Figure 20:
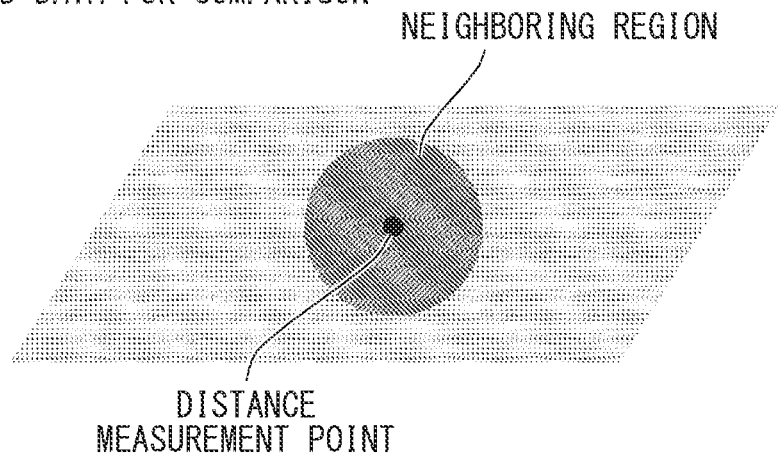

FIG. 20 is a schematic view illustrating a neighboring region for each of cloud data for evaluation and cloud data for comparison.

Figure 21:
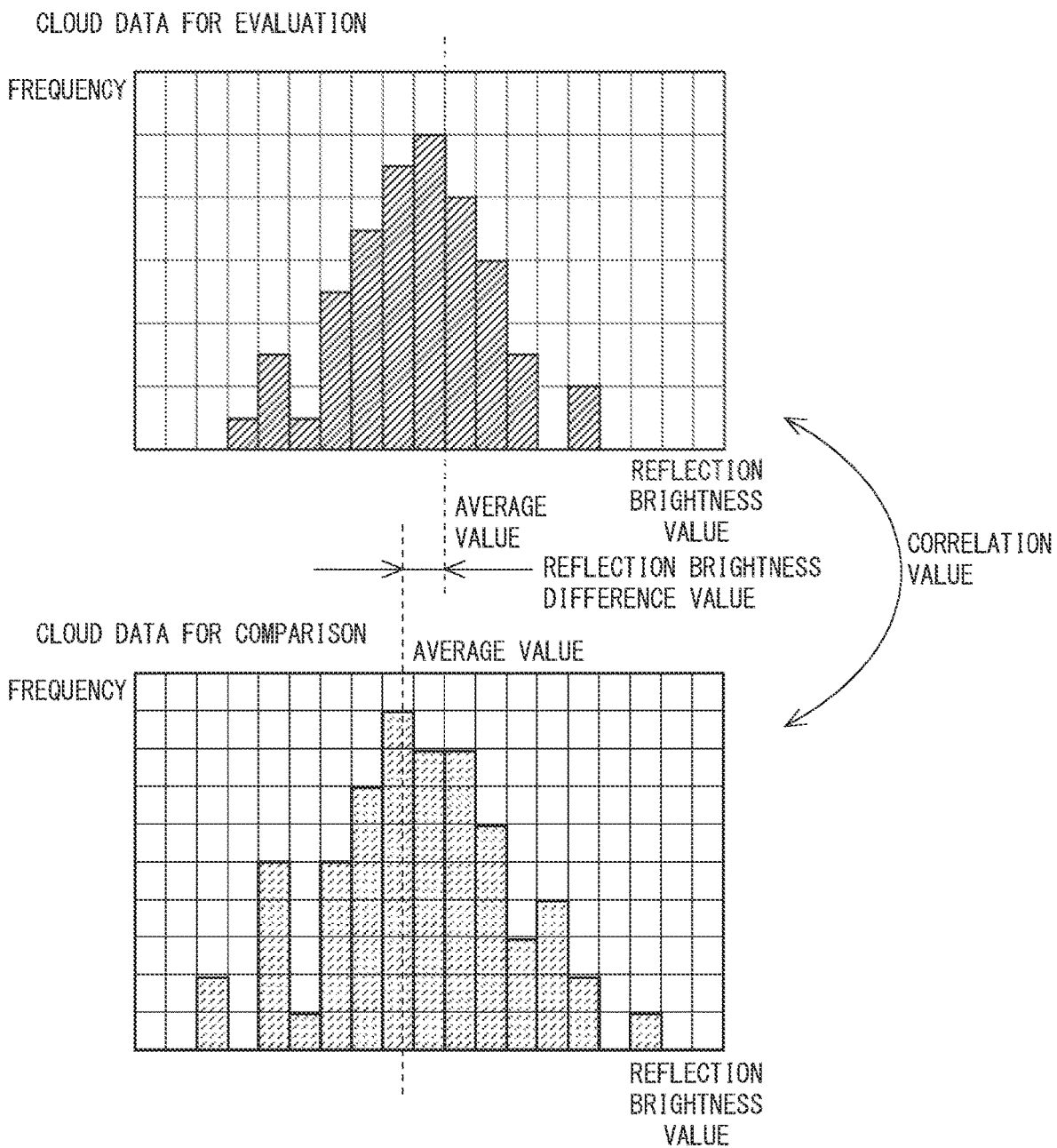
FIG. 21 illustrates a histogram of reflection brightness values in the neighboring region for each of the cloud data for evaluation and the cloud data for comparison.

FIG. 21 illustrates a histogram of reflection brightness values in the neighboring region for each of the cloud data for evaluation and the cloud data for comparison.

The horizontal axis in FIG. 21 indicates a reflection brightness value, and the vertical axis indicates a frequency.

As illustrated in FIG. 20, for example, the neighboring region may be specified using the radius from the distance measurement point or the number of distance measurement points included in the neighboring region.

As illustrated in FIG. 21, the surface abnormality detection device 91 may regard, as the reflection brightness difference value, a difference between an average value of the reflection brightness values in the neighboring region of the cloud data for evaluation and an average value of the reflection brightness values in the neighboring region of the cloud data for comparison. In addition, the surface abnormality detection device 91 may regard, as the reflection brightness difference value, a difference between a median of the reflection brightness values in the neighboring region of the cloud data for evaluation and a median of the reflection brightness values in the neighboring region of the cloud data for comparison.

The surface abnormality detection device 91 may identify the abnormal portion on the surface of the object under measurement based on a correlation value between the cloud data for evaluation and the cloud data for comparison.

Figure 22:
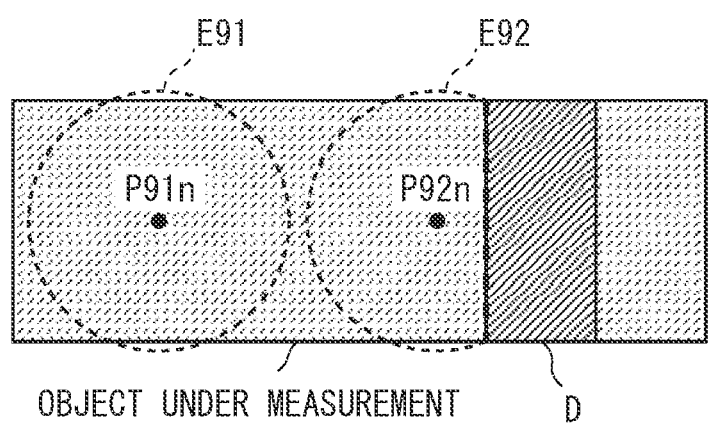
FIG. 22 is schematic view illustrating a neighboring region of a distance measurement point of an object under measurement as viewed from above.

FIG. 22 is schematic view illustrating the neighboring region of the distance measurement point of the object under measurement as viewed from above.

In the ninth example embodiment, the neighboring region may be determined based on RGB (colors) as illustrated in FIG. 22, instead of determining the neighboring region based on the roughness value.

<Correction by RGB>

Specifically, the brightness difference calculation means 716 determines the first neighboring region of the distance measurement points of the cloud data for evaluation based on chromaticity or lightness of the distance measurement points of the cloud data for evaluation. The brightness difference calculation means 716 calculates the first reflection brightness value in the first neighborhood based on the distance measurement points of the cloud data for evaluation in the first neighboring region. The brightness difference calculation means 716 regards the first reflection brightness value in the first neighborhood as the reflection brightness value for evaluation. However, when the object under measurement is classified into the cluster, the first reflection brightness value in the first neighborhood may be regarded as the reflection brightness value at the plurality of distance measurement points of the cluster of the cloud data for evaluation.

The brightness difference calculation means 716 determines the second neighboring region of the distance measurement points of the cloud data for comparison based on chromaticity or lightness of the distance measurement points of the cloud data for comparison. The brightness difference calculation means 716 calculates the second reflection brightness value in the second neighborhood based on the distance measurement points of the cloud data for comparison in the second neighboring region. The brightness difference calculation means 716 regards the second reflection brightness value in the second neighborhood as the reflection brightness value for comparison. However, when the object under measurement is classified into the cluster, the second reflection brightness value in the second neighborhood may be regarded as the reflection brightness value at the plurality of distance measurement points of the cluster of the cloud data for comparison.

However, in the case where, as in a region D illustrated in FIG. 22, a color of the distance measurement points in the region is different from the color of the surrounding region (e.g., the color of the neighboring region E92), the region D is assumed as having a structure different from that of the neighboring region E92, and therefore may be excluded from the neighboring region. In addition, in the case where the chromaticity of the distance measurement points is not within a predetermined chromaticity range, or the lightness of the distance measurement points is not within a predetermined lightness range, a specific region including the distance measurement points may be excluded from the neighboring region.

The cloud data for comparison and the cloud data for evaluation are not limited to the color data. The cloud data for comparison and the cloud data for evaluation may be data imaged by a camera or an infrared camera, or temperature data.

Tenth Example Embodiment

Figure 23:
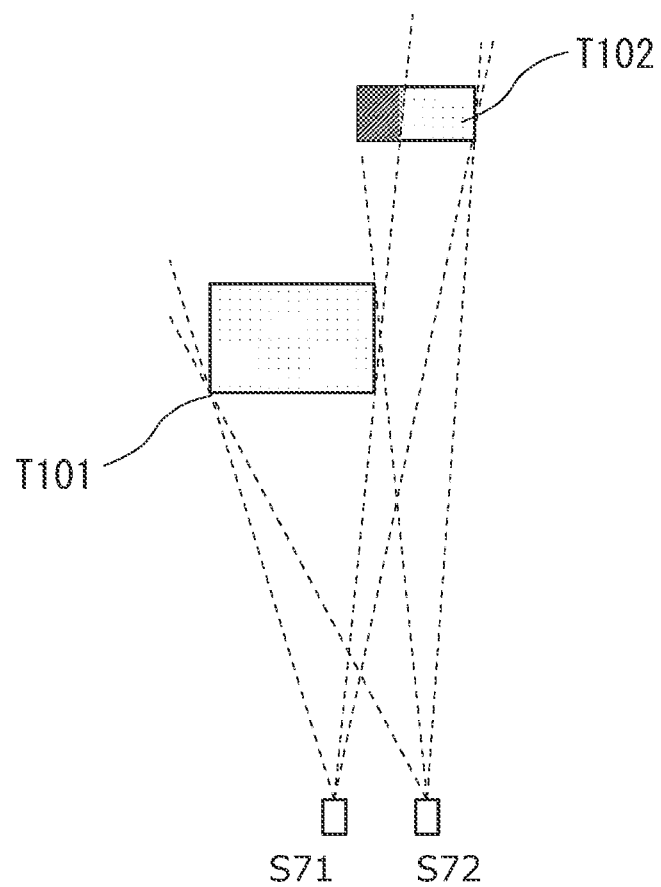
FIG. 23 is a block diagram illustrating the object under measurement being measured.

FIG. 23 is a block diagram illustrating the object under measurement being measured.

Figure 24:
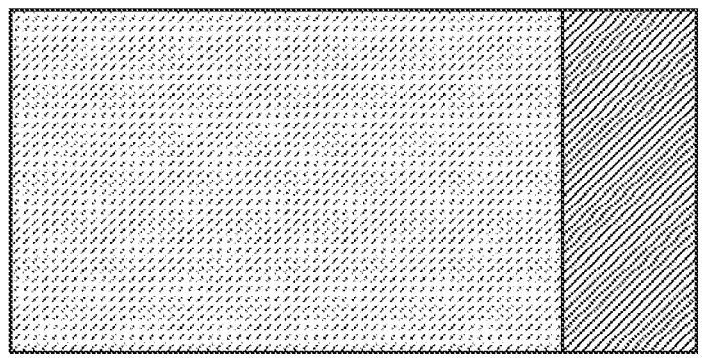
FIG. 24 is a schematic view illustrating a range image measured from each of a first observation point and a second observation point.
Figure 24:
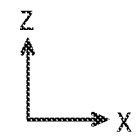
Figure 24:
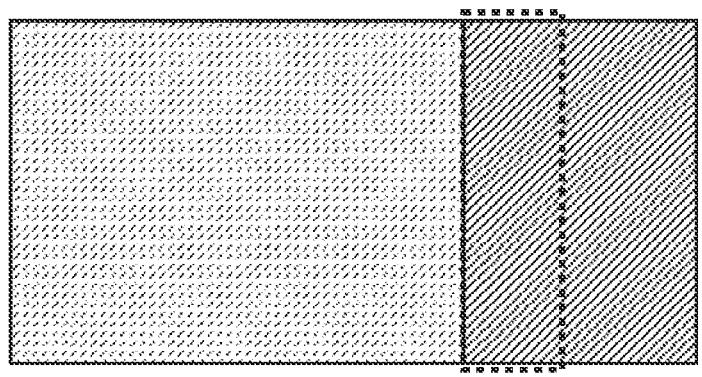
Figure 24:
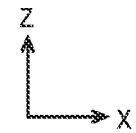

FIG. 24 is a schematic view illustrating a range image measured from each of a first observation point and a second observation point.

In FIG. 24, as the distance to the object under measurement is closer, the image is indicated in white, and as the distance to the object under measurement is farther, the image is indicated in block.

<Correction of Deleting Area to be Occluded>

As illustrated in FIG. 23, when the cloud data for comparison is acquired, an object under measurement T101 and an object under measurement T102 are measured from the first observation point S71. Next, when the cloud data for evaluation is acquired, it is difficult to measure the object under measurement T101 and the object under measurement T102 from exactly the same position as the first observation point S71. As a result, when the cloud data for evaluation is acquired, a positional deviation of the observation point occurs. When such positional deviation occurs, a difference in the range image is produced even when no abnormal portion exists in the object under measurement T101 and the object under measurement T102, as illustrated in FIG. 24. Hereby, the surface abnormality detection device falsely detects, as an abnormal portion, the portion where the difference is produced.

Then, the surface abnormality detection device 101 according to a tenth example embodiment excludes an area to be occluded (also referred to as an occlusion region) from the abnormal portion of the object under measurement, in the cloud data for evaluation and the cloud data for comparison.

Figure 25:
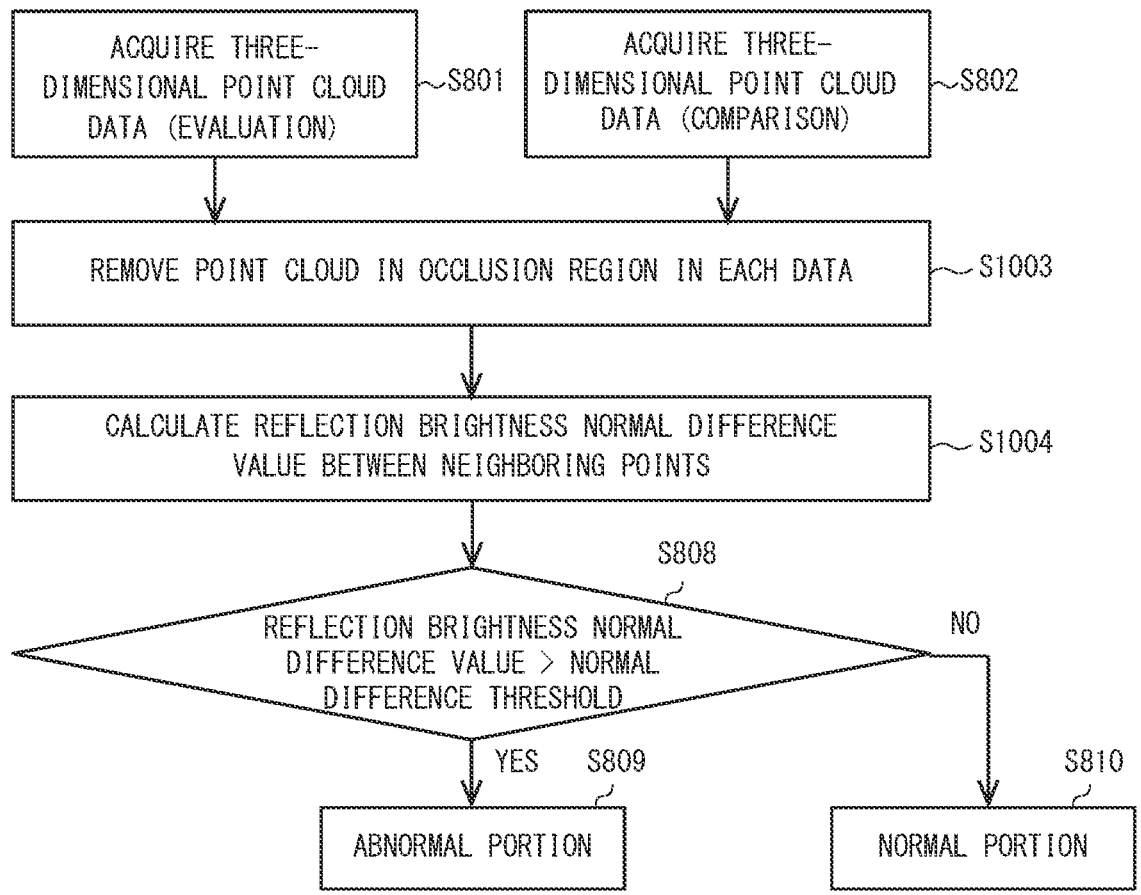
FIG. 25 is a flowchart illustrating an operation of a surface abnormality detection device according to a tenth example embodiment.

FIG. 25 is a flowchart illustrating an operation of the surface abnormality detection device according to the tenth example embodiment.

As illustrated in FIG. 25, after step S801 and step S802, the point cloud data which is to be the occlusion region is removed in each of the point cloud data for evaluation and the point cloud data for comparison (step S1003).

Specifically, the brightness difference calculation means 716 acquires a first distance between the first observation point S71 and the distance measurement point based on the position information of the first observation point S71 and the position information of the distance measurement point on the surface of the object under measurement. In the case where the distance measurement point is obstructed by a part of the object under measurement, which makes it impossible to acquire the first distance, the brightness difference calculation means 716 acquires the first distance by using, as the distance measurement point, an intersection point between a straight line connecting the distance measurement point with the first observation point S71 and the surface of the object under measurement, the intersection point being positioned so that a distance between the object under measurement and the first observation point S71 is the shortest.

The brightness difference calculation means 716 acquires a second distance between the second observation point S72 and the distance measurement point based on the position information of the second observation point S72 and the position information of the distance measurement point. In the case where a difference between the first distance and the second distance is equal to or greater than a predetermined difference, the identification means 713 excludes, from the abnormal portion of the object under measurement, the distance measurement point on the surface of the object under measurement corresponding to the second distance which results in a state of being equal to or greater than the predetermined difference.

After step S1003, the brightness difference calculation means 716 calculates the reflection brightness normal difference value between the neighboring points (between the distance measurement point of the cloud data for evaluation and the distance measurement point of the cloud data for comparison) (step S1004).

The operations of step S1003 and step S1004 can reduce false detection of the abnormal portion due to a positional deviation of the observation point.

Eleventh Example Embodiment

A surface abnormality detection device according to an eleventh example embodiment is different from the surface abnormality detection device 71 according to the seventh example embodiment in that the reflection brightness value at the distance measurement point is corrected based on distance measurement points in the neighboring region in the surroundings of the distance measurement point. Specifically, the correction as described in the ninth example embodiment is performed in the seventh example embodiment.

<Correction by Roughness>

The brightness difference calculation means 716 calculates a first roughness value based on the position information of the distance measurement points of the first point cloud data. The brightness difference calculation means 716 determines a first neighboring region of the distance measurement points of the first point cloud data based on the first roughness value. The brightness difference calculation means 716 calculates the first reflection brightness value in the first neighborhood based on the distance measurement points of the first point cloud data in the first neighboring region. The brightness difference calculation means 716 regards the first reflection brightness value in the first neighborhood as the first reflection brightness value.

The brightness difference calculation means 716 similarly calculates a second roughness value based on the position information of the distance measurement points of the second point cloud data. The brightness difference calculation means 716 determines a second neighboring region of the distance measurement points of the second point cloud data based on the second roughness value. The brightness difference calculation means 716 calculates the second reflection brightness value in the second neighborhood based on the distance measurement points of the second point cloud data in the second neighboring region. The brightness difference calculation means 716 regards the second reflection brightness value in the second neighborhood as the second reflection brightness value.

<Correction by RGB>

The brightness difference calculation means 716 determines the first neighboring region of the distance measurement points of the first point cloud data based on chromaticity or lightness of the distance measurement points of the first point cloud data. The brightness difference calculation means 716 calculates the first reflection brightness value in the first neighborhood based on the distance measurement points of the first point cloud data in the first neighboring region. The brightness difference calculation means 716 regards the first reflection brightness value in the first neighborhood as the first reflection brightness value.

The brightness difference calculation means 716 similarly determines the second neighboring region of the distance measurement points of the second point cloud data based on chromaticity or lightness of the distance measurement points of the second point cloud data. The brightness difference calculation means 716 calculates the second reflection brightness value in the second neighborhood based on the distance measurement points of the second point cloud data in the second neighboring region. The brightness difference calculation means 716 regards the second reflection brightness value in the second neighborhood as the second reflection brightness value.

Twelfth Example Embodiment

A surface abnormality detection device according to a twelfth example embodiment performs the correction as described in the tenth example embodiment, in the seventh example embodiment.

<Correction of Deleting Area to be Occluded>

The brightness difference calculation means 716 acquires a first distance between the first observation point and the distance measurement point based on the position information of the first observation point and the position information of the distance measurement point on the surface of the object under measurement. In the case where the distance measurement point is obstructed by a part of the object under measurement, which makes it impossible to acquire the first distance, the brightness difference calculation means 716 acquires the first distance by using, as the distance measurement point, an intersection point between a straight line connecting the distance measurement point with the first observation point and the surface of the object under measurement, the intersection point being positioned so that a distance between the object under measurement and the first observation point is the shortest. The brightness difference calculation means 716 similarly acquires a second distance between the second observation point and the distance measurement point based on the position information of the second observation point and the position information of the distance measurement point.

In the case where a difference between the first distance and the second distance is equal to or greater than a predetermined difference, the identification means 713 excludes, from the abnormal portion of the object under measurement, the distance measurement point on the surface of the object under measurement corresponding to the second distance which results in a state of being equal to or greater than the predetermined difference.

As described above, according to the example embodiments, there can be provided a processing device capable of reducing false detection when an abnormal matter is detected, a system, a method, and a non-transitory computer-readable medium.

Note that although the present invention has been described as a hardware configuration in the above-described example embodiments, the present invention is not limited the hardware configuration. In the present invention, the processes in each of the components can be also implemented by causing a CPU (Central Processing Unit) to execute a computer program.

In the above-described example embodiments, the program can be stored in various types of non-transitory computer-readable media and thereby supplied to computers. The non-transitory computer-readable media include various types of tangible storage media. Examples of the non-transitory computer-readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Furthermore, the program can be supplied to computers by using various types of transitory computer-readable media. Examples of the transitory computer-readable media include an electrical signal, an optical signal, and an electromagnetic wave. The transitory computer-readable media can be used to supply programs to the computer through a wire communication path such as an electrical wire and an optical fiber, or wireless communication path.

Although the present invention is explained above with reference to example embodiments, the present invention is not limited to the above-described example embodiments. Various modifications that can be understood by those skilled in the art can be made to the configuration and details of the present invention within the scope of the invention.

Note that the present invention is not limited to the above-described example embodiments and various changes may be made therein without departing from the spirit and scope of the present invention.

A part or the entire of the above-described example embodiments may be described as the following supplementary notes, but not limited thereto.

(Supplementary Note 1)

A surface abnormality detection device, comprising:

a classification means for classifying an object under measurement into one or more clusters having the same structure, based on position information at a plurality of points on a surface of the object under measurement;

a determination means for determining a reflection brightness normal value of the cluster based on a distribution of reflection brightness values at a plurality of points on a surface of the cluster; and an identification means for identifying an abnormal portion on the surface of the cluster based on a difference between the reflection brightness normal value and the reflection brightness value at each of the plurality of points on the surface of the cluster.

(Supplementary Note 2)

The surface abnormality detection device according to Supplementary Note 1, wherein the reflection brightness value is corrected based on an attenuation amount due to a distance between an own device which is an observation point and the point on the surface of the cluster.

(Supplementary Note 3)

The surface abnormality detection device according to Supplementary Note 1 or 2, wherein a laser incident angle at a distance measurement point of the cluster is calculated based on a direction connecting the distance measurement point of the cluster and the own device, and a perpendicular line at the distance measurement point of the cluster, and the reflection brightness value at the distance measurement point of the cluster is further corrected based on the laser incident angle.

(Supplementary Note 4)

The surface abnormality detection device according to Supplementary Note 3, wherein the classification means further classifies the cluster into subclusters based on the laser incident angle, the determination means determines a reflection brightness normal value of the subcluster based on a distribution of reflection brightness values at a plurality of points on a surface of the subcluster, and the identification means identifies an abnormal portion on the surface of the subcluster based on a difference between the reflection brightness normal value of the subcluster and the reflection brightness value at each of the plurality of points on the surface of the subcluster.

(Supplementary Note 5)

The surface abnormality detection device according to Supplementary Note 4, wherein the laser incident angle at the distance measurement point of the subcluster is calculated based on a direction connecting the distance measurement point of the subcluster and the own device, and a perpendicular line at the distance measurement point of the subcluster, and the reflection brightness value at the distance measurement point of the subcluster is further corrected based on the laser incident angle at the distance measurement point of the subcluster.

(Supplementary Note 6)

The surface abnormality detection device according to any one of Supplementary Notes 1 to 5, wherein the determination means determines an RGB normal value of the cluster based on a distribution of RGB values at the plurality of points on the surface of the cluster, the identification means identifies an abnormal portion on the surface of the cluster based on a difference between the RGB normal value and the RGB value at each of the plurality of points on the surface of the cluster, and the identification means identifies a desired abnormal portion based on the abnormal portion identified using the reflection brightness value and the abnormal portion identified using the RGB value.

(Supplementary Note 7)

The surface abnormality detection device according to any one of Supplementary Notes 1 to 5, wherein
- a roughness value at each of the plurality of points on the surface of the cluster is calculated based on the position information at the plurality of points on the surface of the cluster,
- the determination means determines a roughness normal value of the cluster based on a distribution of the roughness values at the plurality of points on the surface of the cluster,
- the identification means identifies an abnormal portion on the surface of the cluster based on a difference between the roughness normal value and the roughness value at each of the plurality of points on the surface of the cluster, and the identification means identifies a desired abnormal portion based on the abnormal portion identified using the reflection brightness value and the abnormal portion identified using the roughness value.

(Supplementary Note 8)

A surface abnormality detection device, comprising:
- a first calculation means for calculating a first incident angle of a laser for each of a plurality of distance measurement points based on position information of a first observation point, and position information, included in first point cloud data, of the plurality of distance measurement points of a surface of an object under measurement;
- a second calculation means for calculating a second incident angle of a laser for each of the plurality of distance measurement points based on position information of a second observation point, and position information of the plurality of distance measurement points included in second point cloud data;
- a position control means for making an adjustment to match positions for each of the plurality of distance measurement points based on the position information of the plurality of distance measurement points in the first point cloud data and the position information of the plurality of distance measurement points in the second point cloud data;
- a brightness difference calculation means for calculating, for each of the plurality of distance measurement points, a reflection brightness difference value which is a difference between a first reflection brightness value at each of the plurality of distance measurement points in the first point cloud data after the position adjustment and a second reflection brightness value at each of the plurality of distance measurement points in the second point cloud data after the position adjustment;
- a correction means for calculating, for each of the plurality of distance measurement points, an incident angle difference which is a difference between the first incident angle at each of the plurality of distance measurement points in the first point cloud data after the position adjustment and the second incident angle at each of the plurality of distance measurement points in the second point cloud data after the position adjustment, and correcting, for each of the plurality of distance measurement points, the reflection brightness difference value based on the incident angle difference; and
- an identification means for identifying an abnormal portion of the object under measurement based on the reflection brightness difference value after the correction.

(Supplementary Note 9)

The surface abnormality detection device according to Supplementary Note 8, wherein the brightness difference calculation means calculates a first roughness value based on the position information of the distance measurement points of the first point cloud data, determines a first neighboring region of the distance measurement points of the first point cloud data based on the first roughness value, calculates a first reflection brightness value in a first neighborhood based on the distance measurement points of the first point cloud data in the first neighboring region, regards the first reflection brightness value in the first neighborhood as the first reflection brightness value, calculates a second roughness value based on the position information of the distance measurement points of the second point cloud data, determines a second neighboring region of the distance measurement points of the second point cloud data based on the second roughness value, calculates a second reflection brightness value in a second neighborhood based on the distance measurement points of the second point cloud data in the second neighboring region, and regards the second reflection brightness value in the second neighborhood as the second reflection brightness value.

(Supplementary Note 10)

The surface abnormality detection device according to Supplementary Note 8, wherein the brightness difference calculation means determines a first neighboring region of the distance measurement points of the first point cloud data based on chromaticity or lightness of the distance measurement points of the first point cloud data, calculates a first reflection brightness value in a first neighborhood based on the distance measurement points of the first point cloud data in the first neighboring region, regards the first reflection brightness value in the first neighborhood as the first reflection brightness value, determines a second neighboring region of the distance measurement points of the second point cloud data based on chromaticity or lightness of the distance measurement points of the second point cloud data, calculates a second reflection brightness value in a second neighborhood based on the distance measurement points of the second point cloud data in the second neighboring region, and regards the second reflection brightness value in the second neighborhood as the second reflection brightness value.

(Supplementary Note 11)

The surface abnormality detection device according to any one of Supplementary Notes 8 to 10, wherein the brightness difference calculation means acquires a first distance between the first observation point and the distance measurement point based on the position information of the first observation point and the position information of the distance measurement point on the surface of the object under measurement, acquires the first distance by using, as the distance measurement point, an intersection point between a straight line connecting the distance measurement point with the first observation point and the surface of the object under measurement, the intersection point being positioned so that a distance between the object under measurement and the first observation point is the shortest, in a case where the distance measurement point is obstructed by a part of the object under measurement, which makes it impossible to acquire the first distance, and acquires a second distance between the second observation point and the distance measurement point based on the position information of the second observation point and the position information of the distance measurement point, and in a case where a difference between the first distance and the second distance is equal to or greater than a predetermined difference, the identification means excludes, from the abnormal portion of the object under measurement, the distance measurement point on the surface of the object under measurement corresponding to the second distance which results in a state of being equal to or greater than the predetermined difference.

(Supplementary Note 12)

A surface abnormality detection device, comprising:

a position control means for making an adjustment to match positions for each of a plurality of distance measurement points based on position information of the plurality of distance measurement points on a surface of an object under measurement, the position information being included in cloud data for evaluation and position information of the plurality of distance measurement points included in cloud data for comparison;

a brightness difference calculation means for calculating, for each of the plurality of distance measurement points, a reflection brightness difference value which is a difference between a reflection brightness value for evaluation at each of the plurality of distance measurement points in the cloud data for evaluation after the position adjustment and a reflection brightness value for comparison at each of the plurality of distance measurement points in the cloud data for comparison after the position adjustment; and an identification means for identifying an abnormal portion of the object under measurement based on the reflection brightness difference value.

(Supplementary Note 13)

The surface abnormality detection device according to Supplementary Note 12, wherein the brightness difference calculation means calculates a first roughness value based on the position information of the distance measurement points of the cloud data for evaluation, determines a first neighboring region of the distance measurement points of the cloud data for evaluation based on the first roughness value, calculates a first reflection brightness value in a first neighborhood based on the distance measurement points of the cloud data for evaluation in the first neighboring region, regards the first reflection brightness value in the first neighborhood as the reflection brightness value for evaluation, calculates a second roughness value based on the position information of the distance measurement points of the cloud data for comparison, determines a second neighboring region of the distance measurement points of the cloud data for comparison based on the second roughness value, calculates a second reflection brightness value in a second neighborhood based on the distance measurement points of the cloud data for comparison in the second neighboring region, and regards the second reflection brightness value in the second neighborhood as the reflection brightness value for comparison.

(Supplementary Note 14)

The surface abnormality detection device according to Supplementary Note 12, wherein the brightness difference calculation means determines a first neighboring region of the distance measurement points of the cloud data for evaluation based on chromaticity or lightness of the distance measurement points of the cloud data for evaluation, calculates a first reflection brightness value in a first neighborhood based on the distance measurement points of the cloud data for evaluation in the first neighboring region, regards the first reflection brightness value in the first neighborhood as the reflection brightness value for evaluation, determines a second neighboring region of the distance measurement points of the cloud data for comparison based on chromaticity or lightness of the distance measurement points of the cloud data for comparison, calculates a second reflection brightness value in a second neighborhood based on the distance measurement points of the cloud data for comparison in the second neighboring region, and regards the second reflection brightness value in the second neighborhood as the reflection brightness value for comparison.

(Supplementary Note 15)

The surface abnormality detection device according to any one of Supplementary Notes 12 to 14, wherein the brightness difference calculation means acquires a first distance between the first observation point and the distance measurement point based on the position information of the first observation point and the position information of the distance measurement point on the surface of the object under measurement, acquires the first distance by using, as the distance measurement point, an intersection point between a straight line connecting the distance measurement point with the first observation point and the surface of the object under measurement, the intersection point being positioned so that a distance between the object under measurement and the first observation point is the shortest, in a case where the distance measurement point is obstructed by a part of the object under measurement, which makes it impossible to acquire the first distance, and acquires a second distance between the second observation point and the distance measurement point based on the position information of the second observation point and the position information of the distance measurement point, and in a case where a difference between the first distance and the second distance is equal to or greater than a predetermined difference, the identification means excludes, from the abnormal portion of the object under measurement, the distance measurement point on the surface of the object under measurement corresponding to the second distance which results in a state of being equal to or greater than the predetermined difference.

(Supplementary Note 16)

A surface abnormality detection device, comprising:

a classification means for evaluation for classifying an object under measurement into one or more clusters having the same structure, based on position information at a plurality of distance measurement points on a surface of the object under measurement included in cloud data for evaluation;

a classification means for comparison for classifying the object under measurement into one or more clusters having the same structure, based on position information at the plurality of distance measurement points included in cloud data for comparison;

a determination means for comparison for determining a reflection brightness normal value for each cluster of the cloud data for comparison based on a distribution of reflection brightness values at the plurality of distance measurement points of the cluster of the cloud data for comparison;

a control means for associating the cluster of the cloud data for evaluation with the cluster of the cloud data for comparison recognized as having the same structure, based on the position information of the plurality of distance measurement points of the cluster of the cloud data for evaluation and the position information of the plurality of distance measurement points of the cluster of the cloud data for comparison;

a calculation means for calculating a reflection brightness normal difference value which is a difference between the reflection brightness value at each of the plurality of distance measurement points of the cluster of the cloud data for evaluation and the reflection brightness normal value of the cluster of the cloud data for comparison corresponding to the cluster of the cloud data for evaluation; and an identification means for identifying, for each cluster, an abnormal portion on the surface of the object under measurement based on the reflection brightness normal difference value.

(Supplementary Note 17)

The surface abnormality detection device according to Supplementary Note 16, wherein the calculation means calculates a first roughness value based on the position information of the distance measurement points of the cloud data for evaluation, determines a first neighboring region of the distance measurement points of the cloud data for evaluation based on the first roughness value, calculates a first reflection brightness value in a first neighborhood based on the distance measurement points of the cloud data for evaluation in the first neighboring region, and regards the first reflection brightness value in the first neighborhood as the reflection brightness value at each of the plurality of distance measurement points of the cluster of the cloud data for evaluation, and the determination means for comparison calculates a second roughness value based on the position information of the distance measurement points of the cloud data for comparison, determines a second neighboring region of the distance measurement points of the cloud data for comparison based on the second roughness value, calculates a second reflection brightness value in a second neighborhood based on the distance measurement points of the cloud data for comparison in the second neighboring region, and regards the second reflection brightness value in the second neighborhood as the reflection brightness value at each of the plurality of distance measurement points of the cluster of the cloud data for comparison.

(Supplementary Note 18)

The surface abnormality detection device according to Supplementary Note 16, wherein the calculation means determines a first neighboring region of the distance measurement points of the cloud data for evaluation based on chromaticity or lightness of the distance measurement points of the cloud data for evaluation, calculates a first reflection brightness value in a first neighborhood based on the distance measurement points of the cloud data for evaluation in the first neighboring region, and regards the first reflection brightness value in the first neighborhood as the reflection brightness value at each of the plurality of distance measurement points of the cluster of the cloud data for evaluation, and the determination means for comparison determines a second neighboring region of the distance measurement points of the cloud data for comparison based on chromaticity or lightness of the distance measurement points of the cloud data for comparison, calculates a second reflection brightness value in a second neighborhood based on the distance measurement points of the cloud data for comparison in the second neighboring region, and regards the second reflection brightness value in the second neighborhood as the reflection brightness value at each of the plurality of distance measurement points of the cluster of the cloud data for comparison.

(Supplementary Note 19)

The surface abnormality detection device according to any one of Supplementary Notes 16 to 18, wherein the calculation means acquires a first distance between the first observation point and the distance measurement point based on the position information of the first observation point and the position information of the distance measurement point on the surface of the object under measurement, and acquires the first distance by using, as the distance measurement point, an intersection point between a straight line connecting the distance measurement point with the first observation point and the surface of the object under measurement, the intersection point being positioned so that a distance between the object under measurement and the first observation point is the shortest, in a case where the distance measurement point is obstructed by a part of the object under measurement, which makes it impossible to acquire the first distance, the determination means for comparison acquires a second distance between the second observation point and the distance measurement point based on the position information of the second observation point and the position information of the distance measurement point, and in a case where a difference between the first distance and the second distance is equal to or greater than a predetermined difference, the identification means excludes, from the abnormal portion of the object under measurement, the distance measurement point on the surface of the object under measurement corresponding to the second distance which results in a state of being equal to or greater than the predetermined difference.

(Supplementary Note 20)

A system, comprising:

a measurement device configured to acquire a reflection brightness value at each of a plurality of points on a surface of an object under measurement; and the surface abnormality detection device according to any one of Supplementary Notes 1 to 19, wherein the surface abnormality detection device identifies an abnormal portion on the surface of the object under measurement.

This application is based upon the benefit of priority from International Application Number PCT/JP2019/014790, filed on Apr. 3, 2019, the disclosure of which is incorporated herein in its entirety by reference.

REFERENCE SIGNS LIST

10: SYSTEM
11, 21, 31, 41, 51, 61, 71, 81, 91, 101: SURFACE ABNORMALITY DETECTION DEVICE
111: CLASSIFICATION MEANS
112: DETERMINATION MEANS
113: IDENTIFICATION MEANS
12: DISTANCE MEASUREMENT DEVICE
713, 813: IDENTIFICATION MEANS
714a: FIRST CALCULATION MEANS
714b: SECOND CALCULATION MEANS
715, 815: POSITION CONTROL MEANS
716, 816: BRIGHTNESS DIFFERENCE CALCULATION MEANS
717: CORRECTION MEANS
PC10, PC11, PC12, PC31, PC32, PC41: POINT CLOUD
R31: THREE-DIMENSIONAL REGION
C101, C102: CLUSTER
SC401, SC402: SUBCLUSTER
G11, G41, G42: REFLECTION BRIGHTNESS DISTRIBUTION
H101, H102, H411, H421, H422: HISTOGRAM
L101, L411, L421: APPROXIMATE CURVE
P301, P71$n$, P72$n$, P91$n$, P92$n$: DISTANCE MEASUREMENT POINT
A301, A711, A712, A721, A722: LASER INCIDENT ANGLE
N301: PERPENDICULAR LINE
B301: LASER INCIDENT DIRECTION
P: ARBITRARY POINT
T71, T72, T101, T102: OBJECT UNDER MEASUREMENT
S71: FIRST OBSERVATION POINT
S72: SECOND OBSERVATION POINT
D: REGION
E91, E92: NEIGHBORING REGION

What is claimed is:

1. A surface abnormality detection device, comprising:

at least one memory storing instructions, and at least one processor configured to execute the instructions to:

classify an object under measurement into one or more clusters having same structure, based on position information at a plurality of points on a surface of the object under measurement;

determine a reflection brightness normal value of a cluster based on a distribution of reflection brightness values at a plurality of points on a surface of the cluster; and identify an abnormal portion on the surface of the cluster based on a difference between the reflection brightness normal value and the reflection brightness value at each of the plurality of points on the surface of the cluster, wherein a laser incident angle at a distance measurement point of the cluster is calculated based on a direction connecting the distance measurement point of the cluster and the own device, and a perpendicular line at the distance measurement point of the cluster, the reflection brightness value at the distance measurement point of the cluster is further corrected based on the laser incident angle, wherein the at least one processor further configured to execute the instructions to;

classify the cluster into subclusters based on the laser incident angle, the determination means determines a reflection brightness normal value of a subcluster based on a distribution of reflection brightness values at a plurality of points on a surface of the subcluster, and identify an abnormal portion on the surface of the subcluster based on a difference between the reflection brightness normal value of the subcluster and the reflection brightness value at each of the plurality of points on the surface of the subcluster, wherein the laser incident angle at the distance measurement point of the subcluster is calculated based on a direction connecting the distance measurement point of the subcluster and the own device, and a perpendicular line at the distance measurement point of the subcluster, and the reflection brightness value at the distance measurement point of the subcluster is further corrected based on the laser incident angle at the distance measurement point of the subcluster.

2. A system, comprising:

a measurement device configured to acquire a reflection brightness value at each of a plurality of points on a surface of an object under measurement; and the surface abnormality detection device according to claim 1, wherein the surface abnormality detection device
identifies an abnormal portion on the surface of the object under measurement.

3. A surface abnormality detection device, comprising:

at least one memory storing instructions, and at least one processor configured to execute the instructions to:

calculate a first incident angle of a laser for each of a plurality of distance measurement points based on position information of a first observation point, and position information, included in first point cloud data, of the plurality of distance measurement points of a surface of an object under measurement;

calculate a second incident angle of a laser for each of the plurality of distance measurement points based on position information of a second observation point, and position information of the plurality of distance measurement points included in second point cloud data;

make an adjustment to match positions for each of the plurality of distance measurement points based on the position information of the plurality of distance measurement points in the first point cloud data and the position information of the plurality of distance measurement points in the second point cloud data;

calculate, for each of the plurality of distance measurement points, a reflection brightness difference value which is a difference between a first reflection brightness value at each of the plurality of distance measurement points in the first point cloud data after the position adjustment and a second reflection brightness value at each of the plurality of distance measurement points in the second point cloud data after the position adjustment;

calculate, for each of the plurality of distance measurement points, an incident angle difference which is a difference between the first incident angle at each of the plurality of distance measurement points in the first point cloud data after the position adjustment and the second incident angle at each of the plurality of distance measurement points in the second point cloud data after the position adjustment, and correct, for each of the plurality of distance measurement points, the reflection brightness difference value based on the incident angle difference;

identify an abnormal portion of the object under measurement based on the reflection brightness difference value after the correction;

calculate a first roughness value based on the position information of the distance measurement points of the first point cloud data;

determine a first neighboring region of the distance measurement points of the first point cloud data based on the first roughness value;

calculate a first reflection brightness value in a first neighborhood based on the distance measurement points of the first point cloud data in the first neighboring region;

regard the first reflection brightness value in the first neighborhood as the first reflection brightness value;

calculate a second roughness value based on the position information of the distance measurement points of the second point cloud data;

determine a second neighboring region of the distance measurement points of the second point cloud data based on the second roughness value;

calculate a second reflection brightness value in a second neighborhood based on the distance measurement points of the second point cloud data in the second neighboring region; and regard the second reflection brightness value in the second neighborhood as the second reflection brightness value.

4. A surface abnormality detection device, comprising:

at least one memory storing instructions, and at least one processor configured to execute the instructions to:

make an adjustment to match positions for each of a plurality of distance measurement points based on position information of the plurality of distance measurement points on a surface of an object under measurement, the position information being included in cloud data for evaluation and position information of the plurality of distance measurement points included in cloud data for comparison;

calculate, for each of the plurality of distance measurement points, a reflection brightness difference value which is a difference between a reflection brightness value for evaluation at each of the plurality of distance measurement points in the cloud data for evaluation after the position adjustment and a reflection brightness value for comparison at each of the plurality of distance measurement points in the cloud data for comparison after the position adjustment;

identify an abnormal portion of the object under measurement based on the reflection brightness difference value;

calculate a first roughness value based on the position information of the distance measurement points of the cloud data for evaluation;

determine a first neighboring region of the distance measurement points of the cloud data for evaluation based on the first roughness value;

calculate a first reflection brightness value in a first neighborhood based on the distance measurement points of the cloud data for evaluation in the first neighboring region;

regard the first reflection brightness value in the first neighborhood as the reflection brightness value for evaluation;

calculate a second roughness value based on the position information of the distance measurement points of the cloud data for comparison;

determine a second neighboring region of the distance measurement points of the cloud data for comparison based on the second roughness value;

calculate a second reflection brightness value in a second neighborhood based on the distance measurement points of the cloud data for comparison in the second neighboring region; and regard the second reflection brightness value in the second neighborhood as the reflection brightness value for comparison.

* * * * *